(12) United States Patent
Emmelmann

(10) Patent No.: US 8,533,288 B2
(45) Date of Patent: Sep. 10, 2013

(54) INTERACTIVE SERVER SIDE COMPONENTS

(76) Inventor: Helmut Emmelmann, Mannheim (DE)

( * ) Notice: Subject to any disclaimer, the term of this patent is extended or adjusted under 35 U.S.C. 154(b) by 0 days.

(21) Appl. No.: 13/345,513

(22) Filed: Jan. 6, 2012

(65) Prior Publication Data

US 2012/0110068 A1 May 3, 2012

Related U.S. Application Data

(62) Division of application No. 12/218,427, filed on Jul. 15, 2008, now Pat. No. 8,112,502, which is a division of application No. 09/449,021, filed on Nov. 24, 1999.

(60) Provisional application No. 60/110,657, filed on Nov. 27, 1998, provisional application No. 60/110,815, filed on Nov. 25, 1998.

(51) Int. Cl.
  *G06F 15/16* (2006.01)

(52) U.S. Cl.
  USPC ........... 709/217; 709/203; 709/218; 709/219; 709/223

(58) Field of Classification Search
  USPC ................. 709/203, 217–219, 223; 715/234; 717/100, 103
  See application file for complete search history.

(56) References Cited

U.S. PATENT DOCUMENTS

| | | | | |
|---|---|---|---|---|
| 5,920,725 A | * | 7/1999 | Ma et al. | 717/171 |
| 5,968,119 A | * | 10/1999 | Stedman et al. | 709/219 |
| 6,122,661 A | * | 9/2000 | Stedman et al. | 709/217 |
| 6,275,935 B1 | * | 8/2001 | Barlow et al. | 713/182 |
| 6,631,512 B1 | * | 10/2003 | Onyeabor | 717/100 |
| 8,112,502 B2 | * | 2/2012 | Emmelmann | 709/219 |
| 2002/0002569 A1 | * | 1/2002 | Nguyen et al. | 707/515 |
| 2002/0023114 A1 | * | 2/2002 | Ito | 707/523 |

OTHER PUBLICATIONS

Office Action dated Oct. 7, 2010 in U.S. Appl. No. 12/218,427.
Office Action Response dated Jan. 7, 2010 in U.S. Appl. No. 12/218,427.
Notice of Allowance dated Mar. 16, 2011 in U.S. Appl. No. 12/218,427.
Notice of Allowance dated Oct. 3, 2011 and Oct. 20, 2011 in U.S. Appl. No. 12/218,427.
Decision on Appeal dated Feb. 24, 2012 in U.S. Appl. No. 09/449,021.
Transcript of Oral Hearing dated Apr. 4, 2012, from U.S. Appl. No. 09/449,021.
Notice of Allowance dated Jun. 18, 2012, from U.S. Appl. No. 09/449,021.

(Continued)

*Primary Examiner* — Ramy M Osman

(57) ABSTRACT

Server side internet applications are created by placing interactive server side components (ISSC's) on internet pages. ISSC's encapsulate dynamic page functions including processing of user responses on the server and thus can be reused, which drastically reduces programming effort. The ISSC technique remembers information (in form of an ISSC object) about each ISSC during dynamic page generation on the server. Then, it generates HTML code in a way such that the ISSC event is sent to the server using a conventional HTTP GET or POST request. On the server, the event is then passed to the corresponding ISSC object. All components work without disturbing each other, even when nested or combined. A browser based editor can also be used to place ISSC's on pages and to modify their properties. During dynamic page generation, scripts and handles are embedded into the page that permit editing of the page itself.

15 Claims, 36 Drawing Sheets

Model for Server Based Internet Applications with ISSCs

(56) References Cited

OTHER PUBLICATIONS

Request for Continued Examination as Filed Sep. 17, 2012 in U.S. Appl. No. 09/449,021.

Notice of Allowance dated Oct. 18, 2012, from U.S. Appl. No. 09/449,021.
Notice of Allowance dated Jun. 15, 2012, from U.S. Appl. No. 12/966,976.

* cited by examiner

FIG. 2

| heitml Component Editor – Microsoft Internet Explorer |

| File | Edit | Insert | Options | Help |

⇐ ◁ ▷ ▷| [Select ▽] M C [Edit ▽] [Insert ▽]
Best  C.Select  Inspector Mode  Page Mode  Quick Insert

Fieldtext

Text field.

| Property | Value | Description |
|---|---|---|
| Name | Guest_Name | Field name. |
| Size | 50 | Field size in characters. |
| Maxlength | | Limit to the length of the field's value. |
| Value | | Initial field value. |
| Mandatory | ☐ | Check to require the user to fill out the field. |
| Trim | ☑ | Check to trim leading and trailing whitespace from value. |
| Descr | | A description of the field value. |
| Disabled | ○ Yes ○ No ⦿ Like form | Is field disabled? |
| Password | ☐ | Check to render input unreadable. |

[Save] [Delete] [Cancel] [Source]

FIG. 4

```
<H1>Database Search & Edit Form</H1>
<P>This is the fill-in form used to create new entries, to search, modify, or delete records
<dbform id=se.dbform1 relation="guestbook" key="Guest_Name" method="post" >
  <table bgcolor="#90bb90" cellspacing=0 cellpadding=5 border=0 >
    <tr><td> Name</td>
        <td><dbfield name="Guest_Name" size=50 mandatory=false trim=true></td></tr>
    <tr> <td> E-Mail</td>
        <td><dbfield name="Email" size=50 mandatory=false trim=true></td></tr>
    <tr><td>Address</td><dbfield name="Address" size=60 mandatory=false trim=true></td></tr>
    <tr><td>Country</td><td><dbfield name="Country" size=60 mandatory=false trim=true></td></tr>
    <tr><td>Comment</td><td> <dbfield name="Comment" rows=5 cols=60></td></tr>
  </TABLE>
  <dbformbutton name="find" type="find" ></dbformbutton>
  <dbformbutton name="modify" type="modify"></dbformbutton>
  <dbformbutton name="delete" type="delete"></dbformbutton>
  <dbformbutton name="clear" type="clear" ></dbformbutton>
</dbform>
```

Fig.5: Page Source of Sample Page

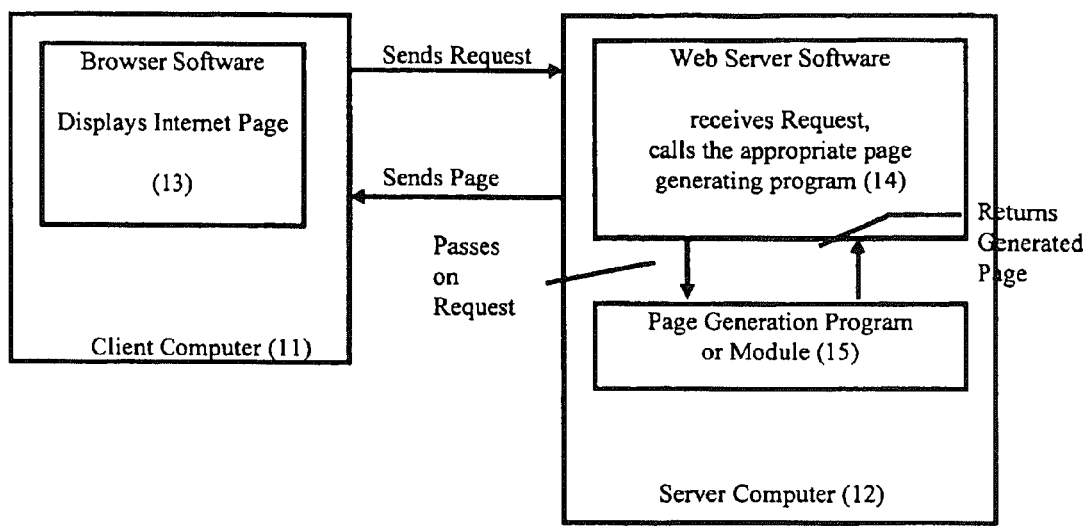
Fig. 6: State of the Art Model for Server Based Internet Applications

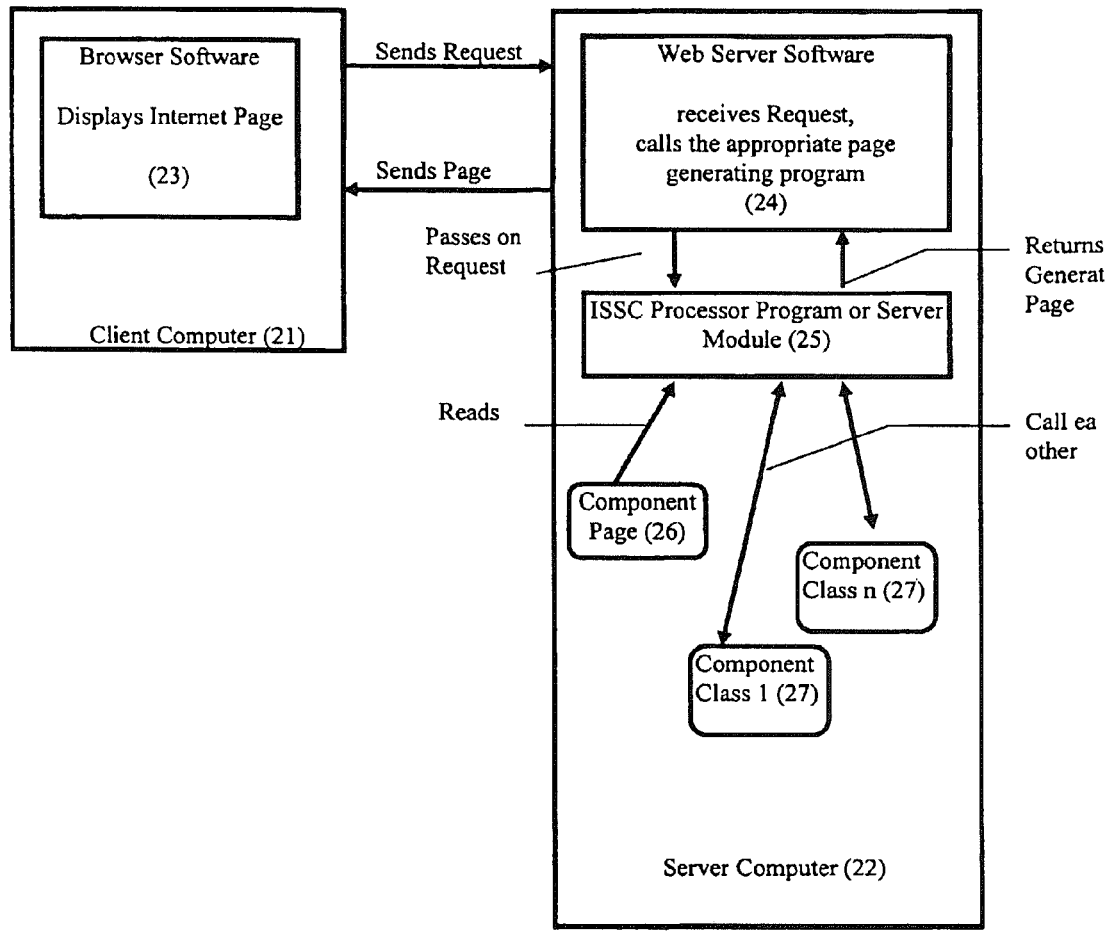
Fig. 7: Model for Server Based Internet Applications with ISSCs

Generation Algorithm

Parameter l is a cb-list

Fig. 9: Generation Algorithm

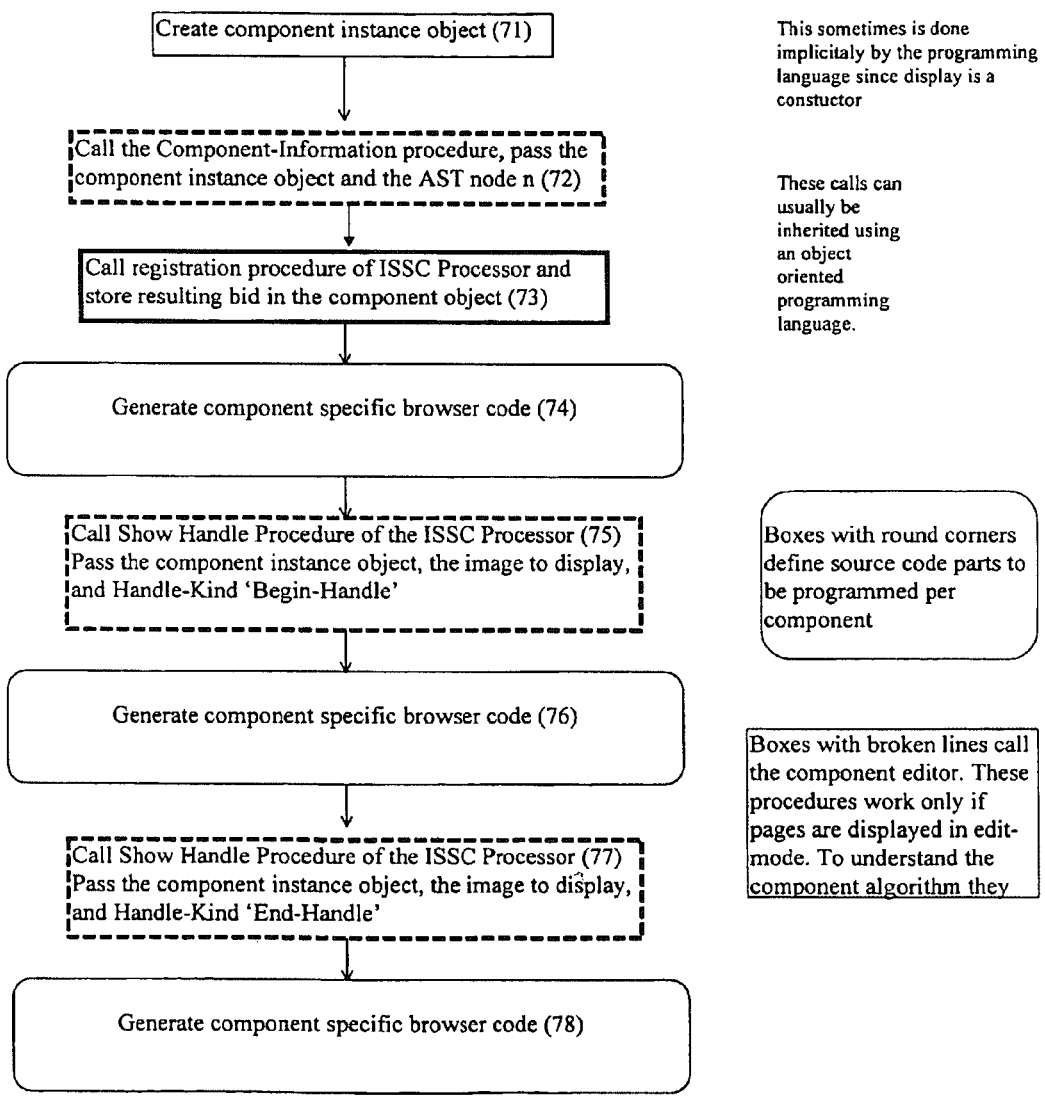
Fig.11: Display Method Algorithm Structure

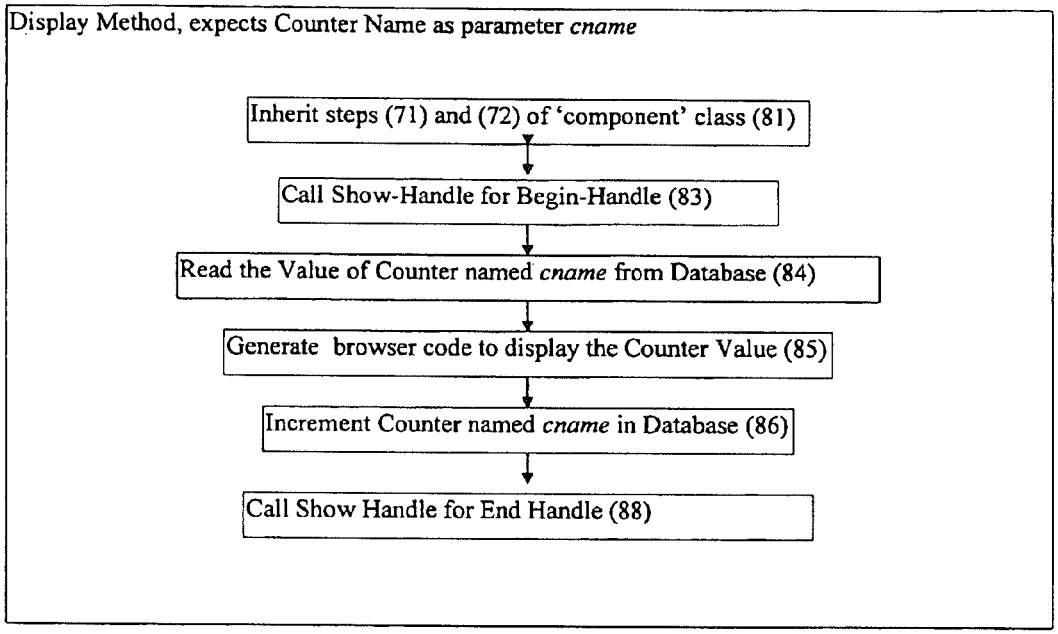
Fig. 12: Example Counter Component Class

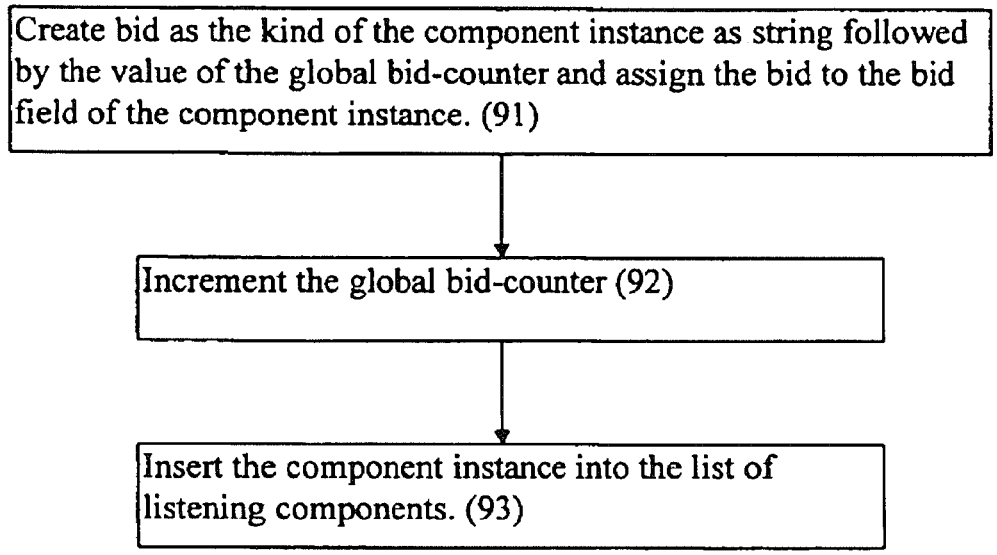
Fig. 13: Registration Procedure

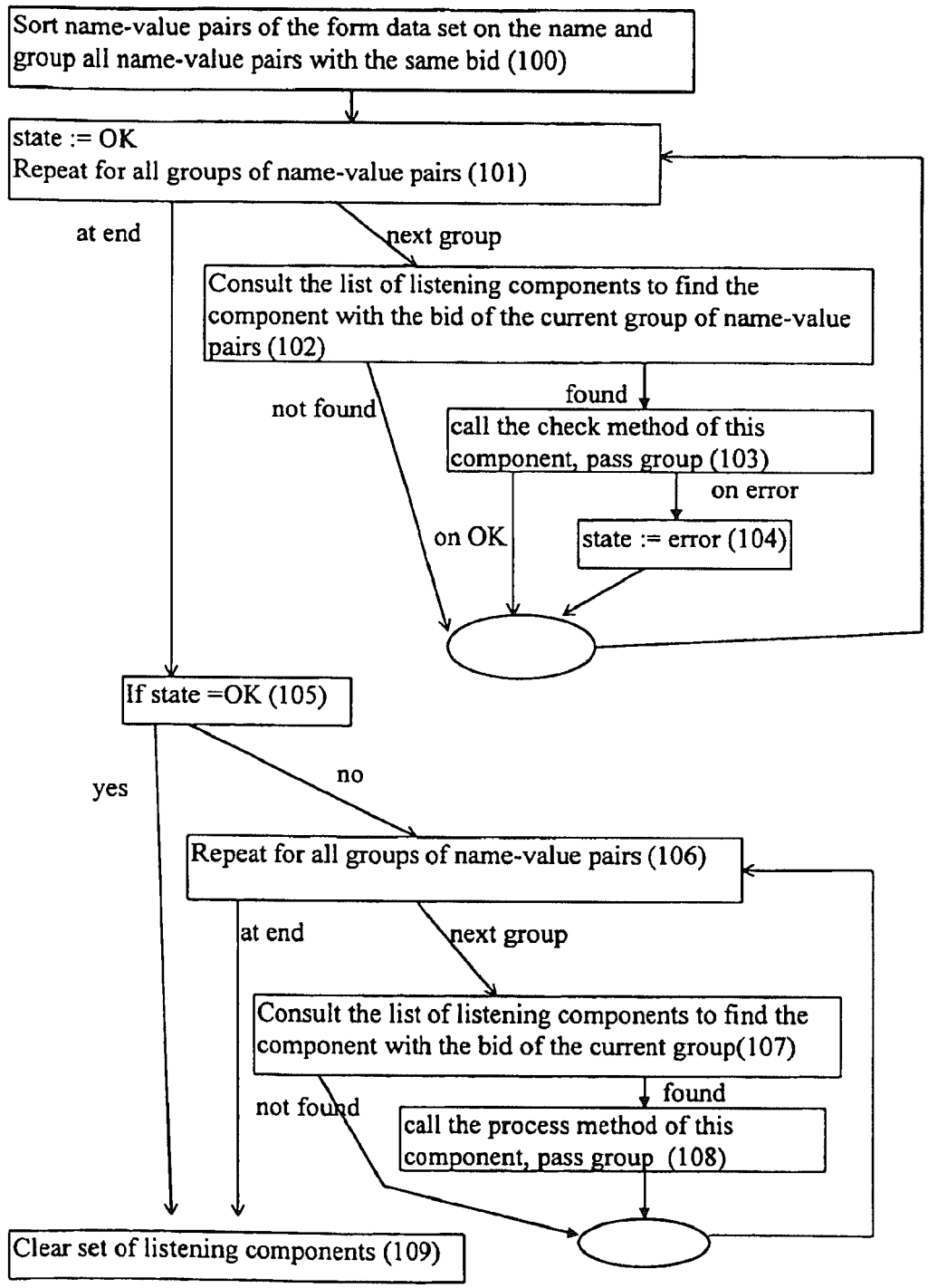
Fig. 14: Component Processing Algorithm

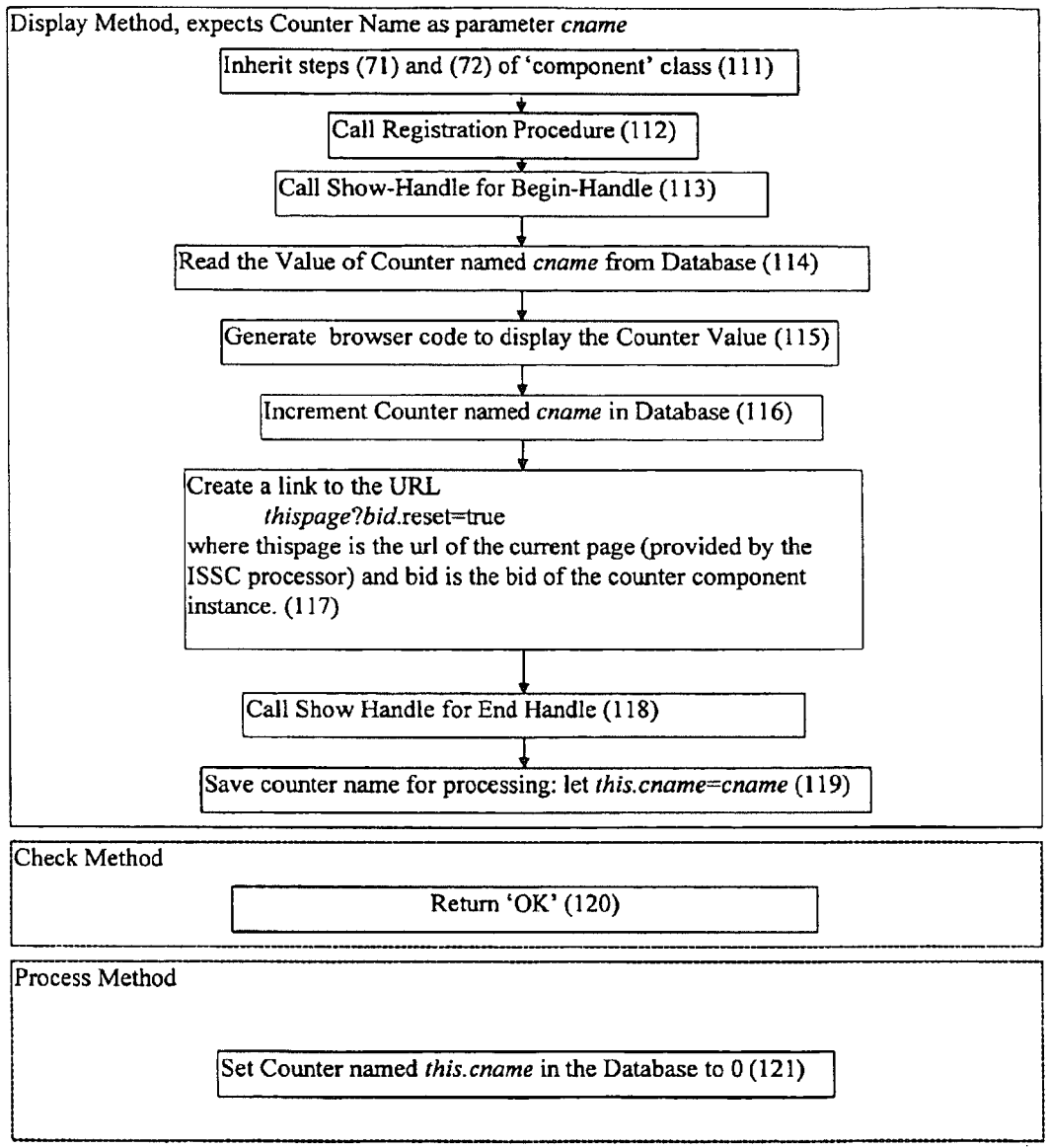
Fig. 15: Example Component Class for Counter with Reset

Sample Component Class: dbinsertpanel
Inherit from Class 'Component'
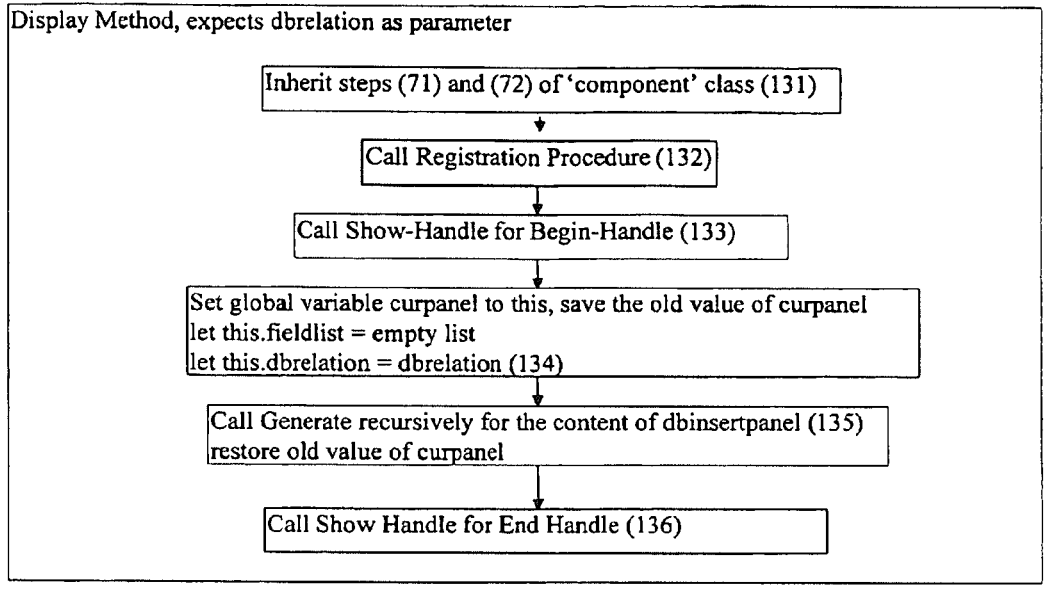
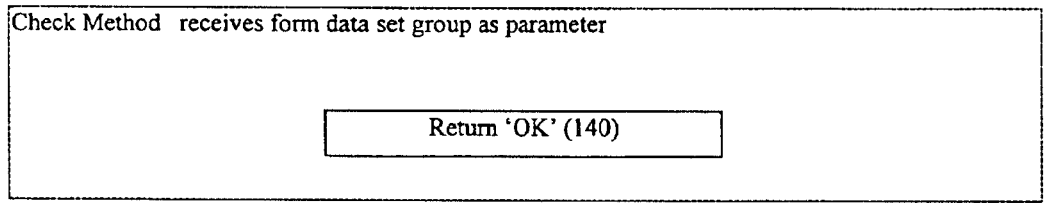
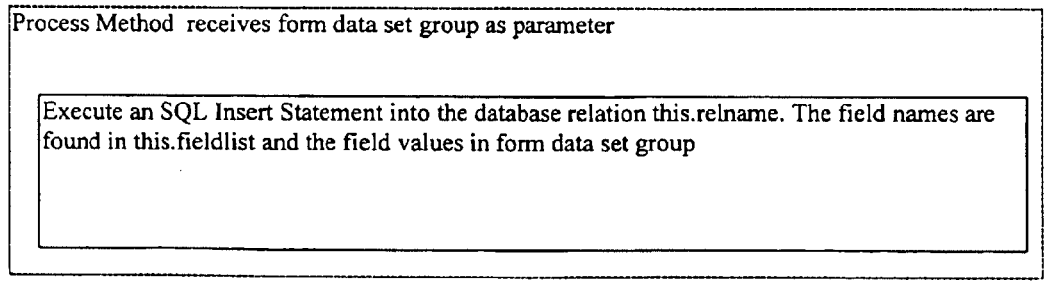
Fig. 16: Example Component Class for dbinsertpanel

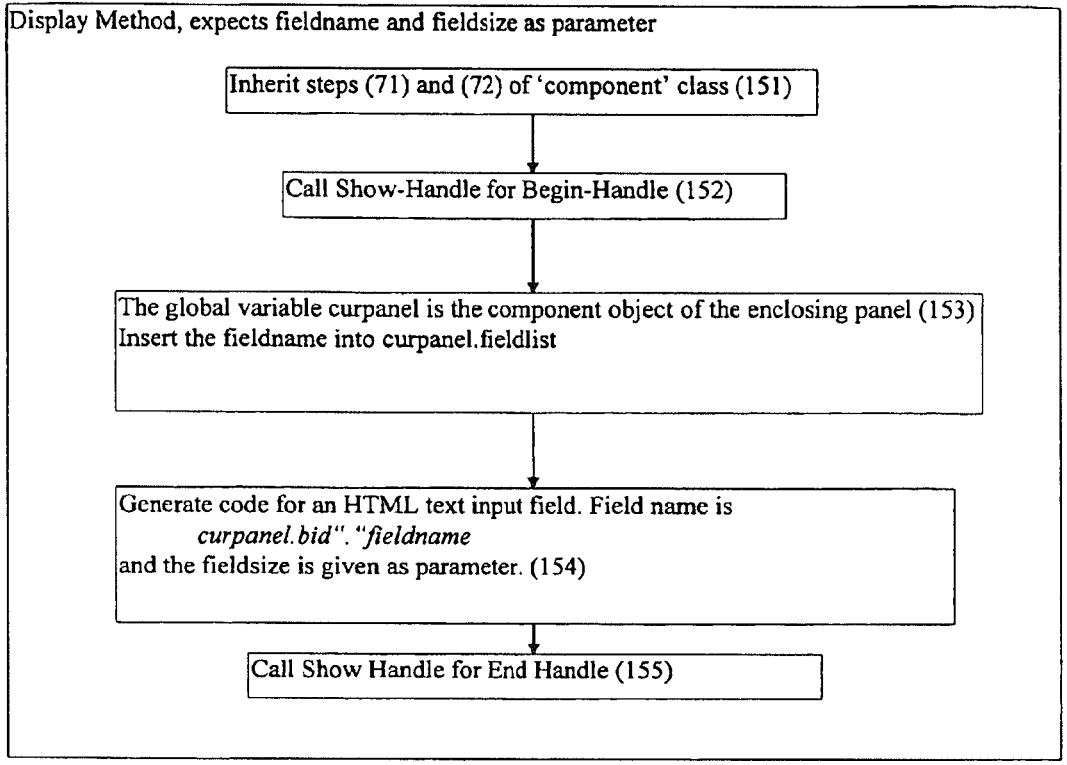
Fig. 17: Example Component Class for dninsertfield

Editor Structure
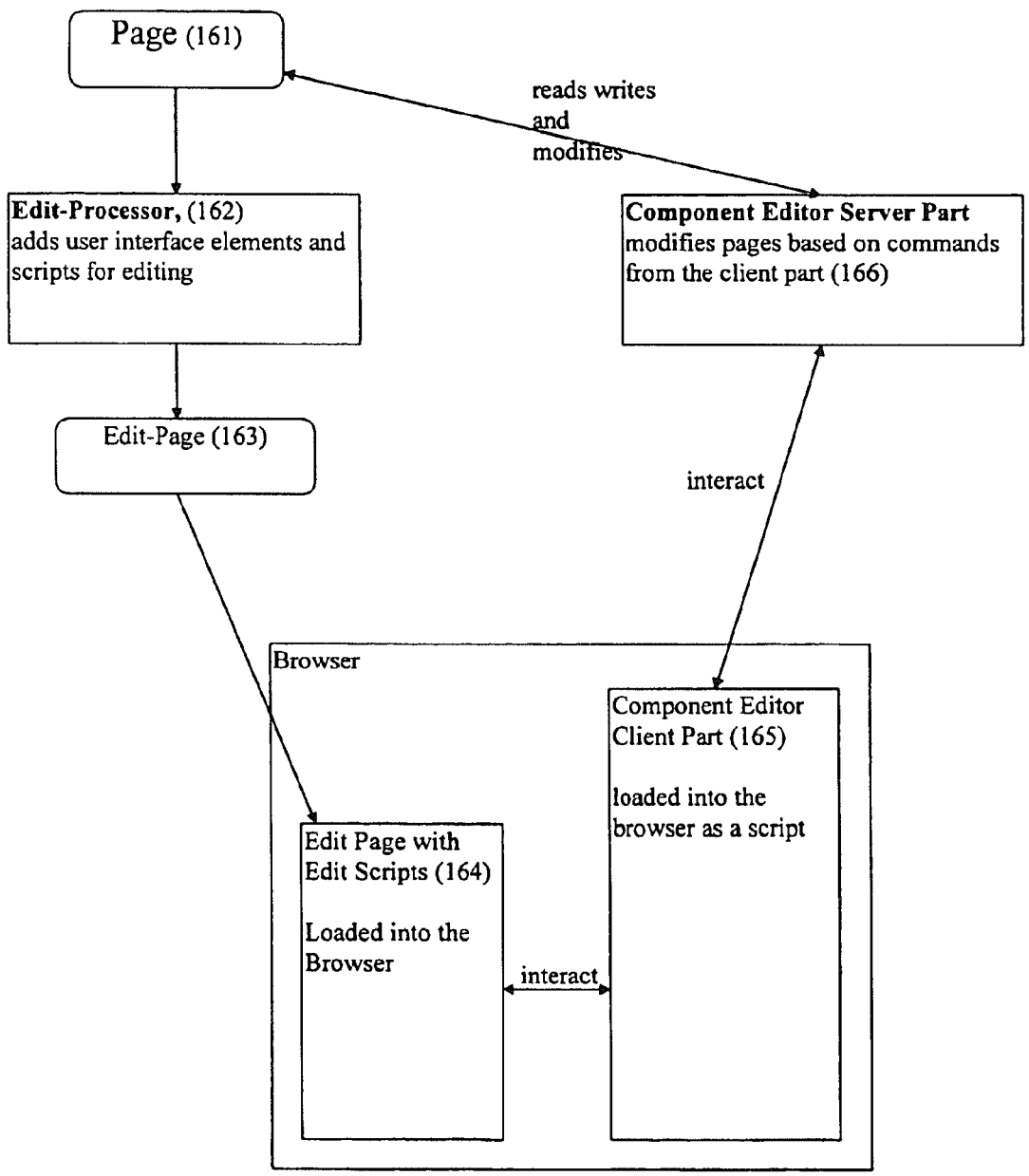
Fig.18: Editor Structure

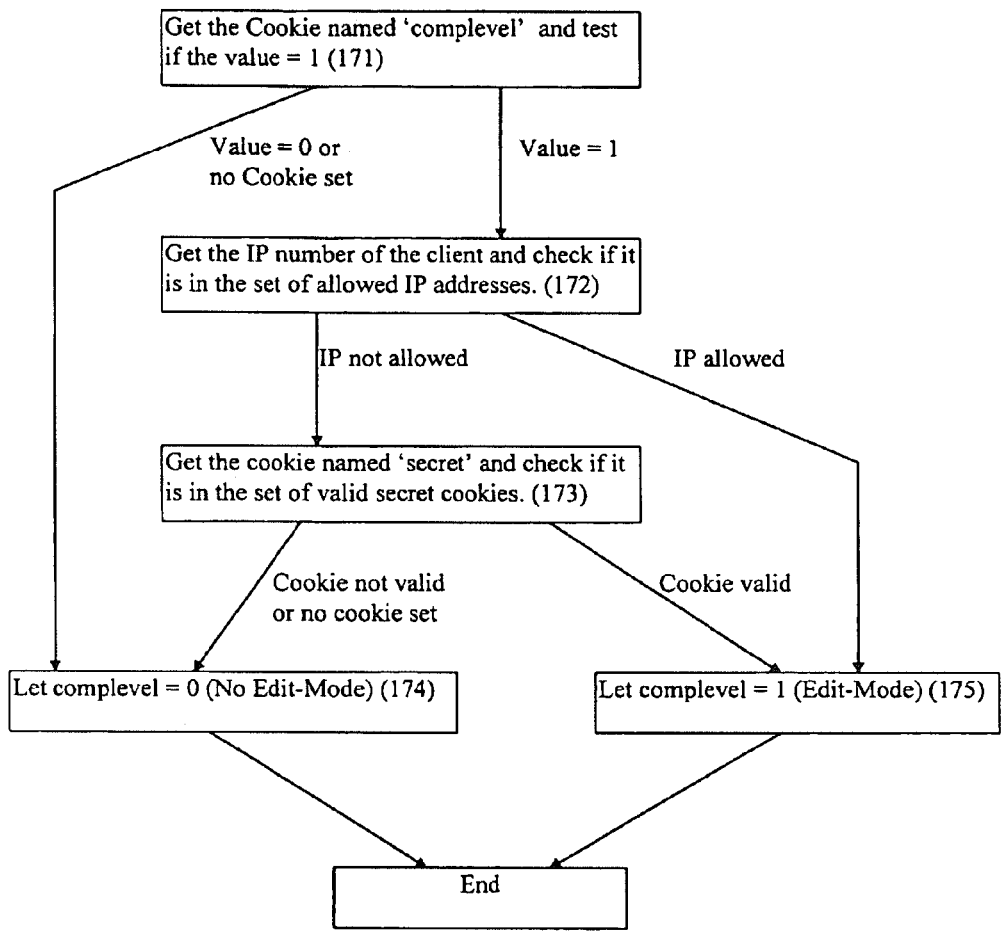
Fig.19: Component Editor Initialization Procedure

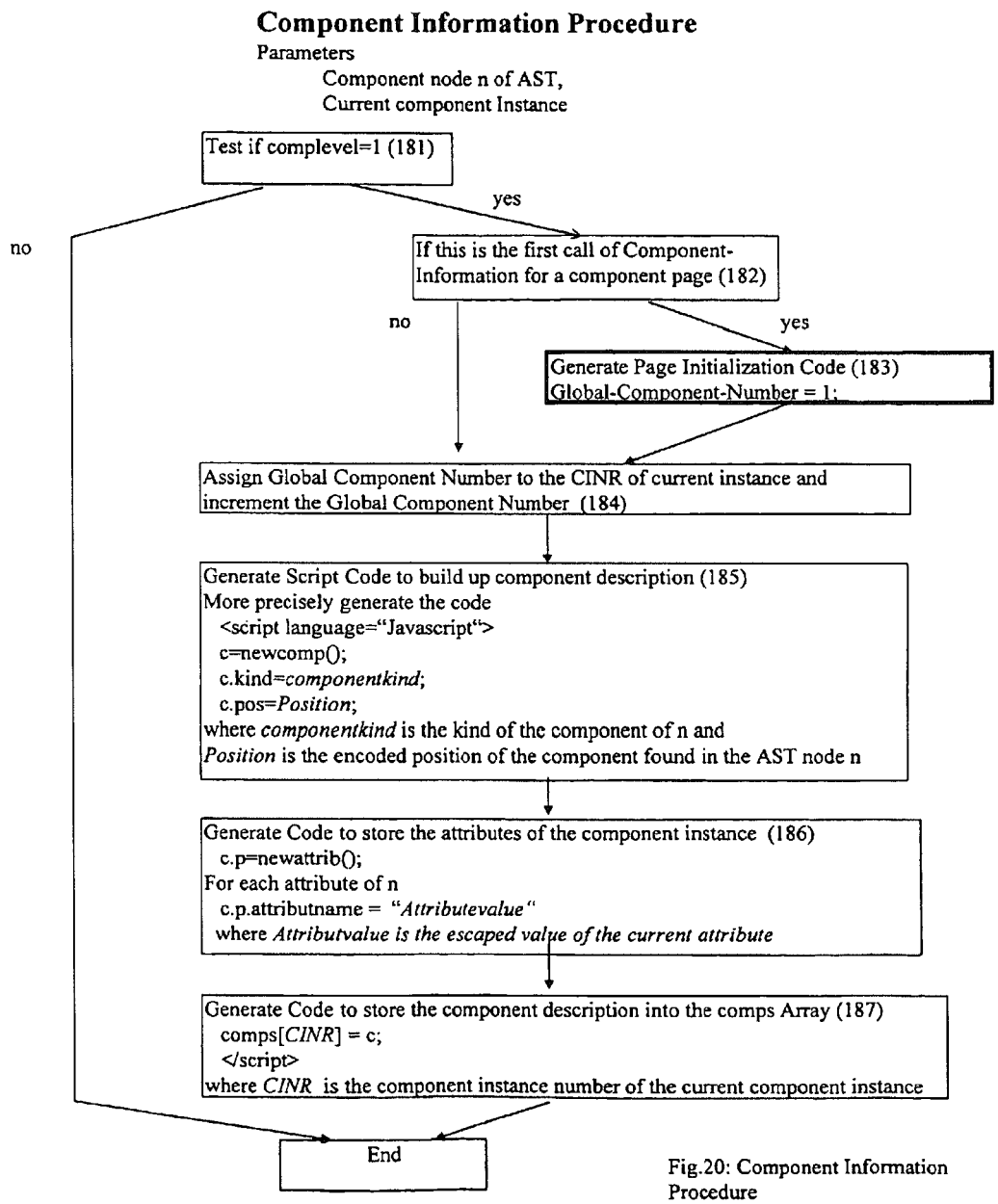
Fig.20: Component Information Procedure

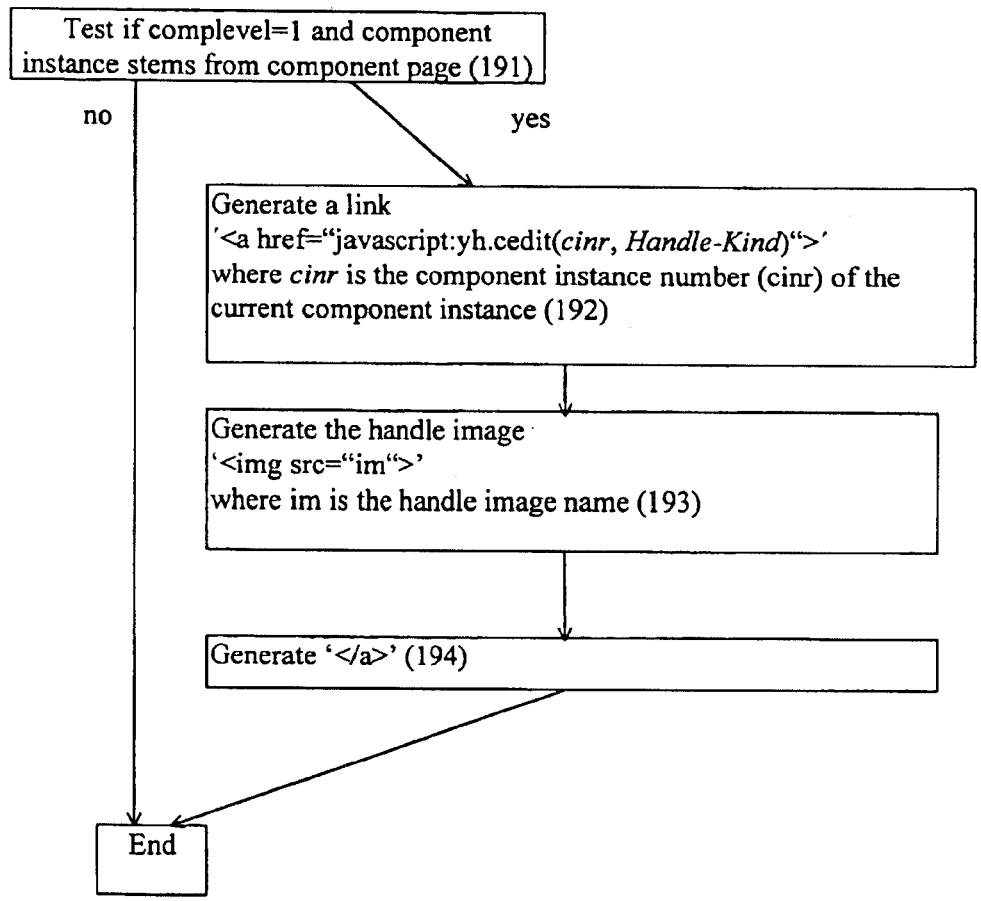
Fig.21: Component Editor Show Handle Procedure

Generate-Page-Initialization-Code

Generate code to set the variable yh to point to the component editor control window. For example in javascript this is achieved by using the open function with the window name of the component editor control window.
Generate code to store the own window handle in yh.appwindow so that the control window can access the Application-window. (201)

Generate definitions of helper functions necessary to create component descriptions. These are basically empty constructors to create the component description and attribute description objects. (202)

Fig.22: Generate Page Initialization Code

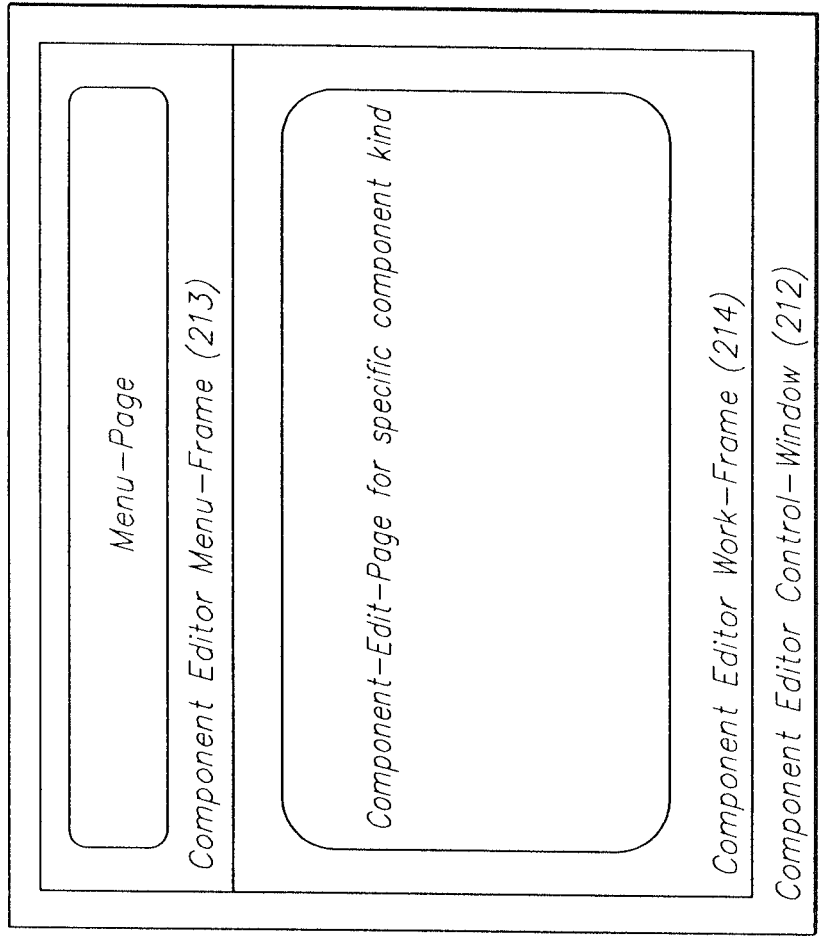
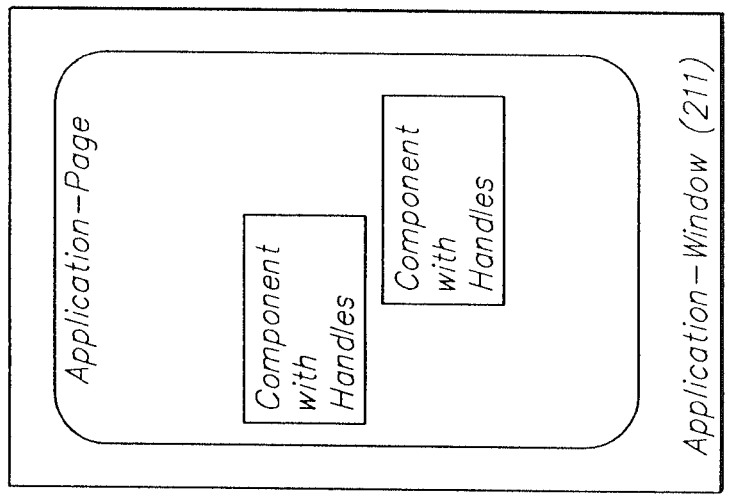
FIG. 23

Fig.24: Component Editor Client Part Page Structure

Fig. 25: Component Editor Start Page

Fig. 26: Component Editor Control Page

Fig. 27: Insert Procedure

Process-Content Procedure

Fig.31: Process Content Procedure

Generate-Component-Text Procedure
Parameters:
Decoded Form Data Set of Component Form
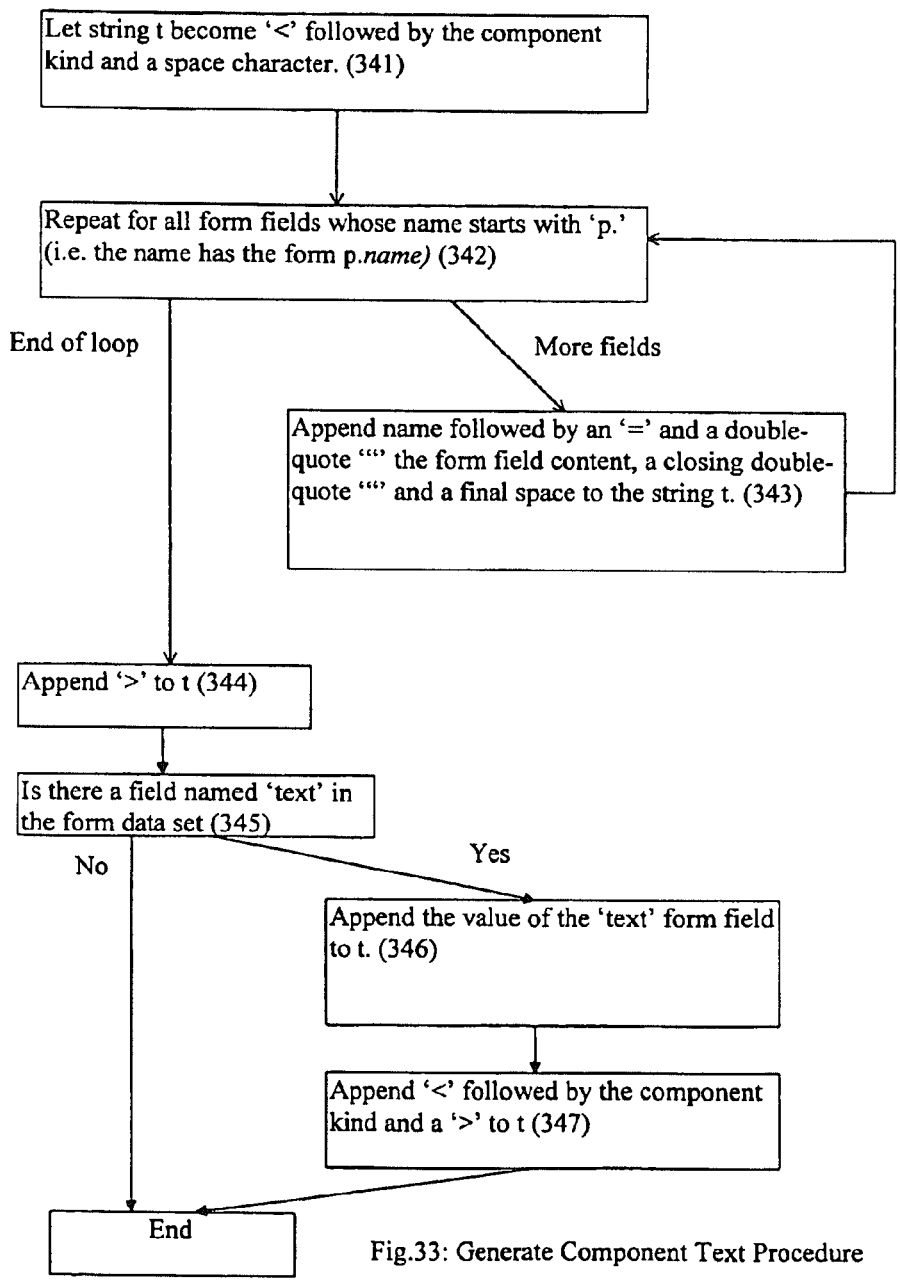
Fig.33: Generate Component Text Procedure

Multi-Window Applications

To make the generation algorithm work for multiple windows replace step (93) of the registration subprocedure of the generation algorithm by > Insert the component instance into that list of listening components that belongs to the destination window. (351)

Insert Step (352) before step (101) of Fig. 14

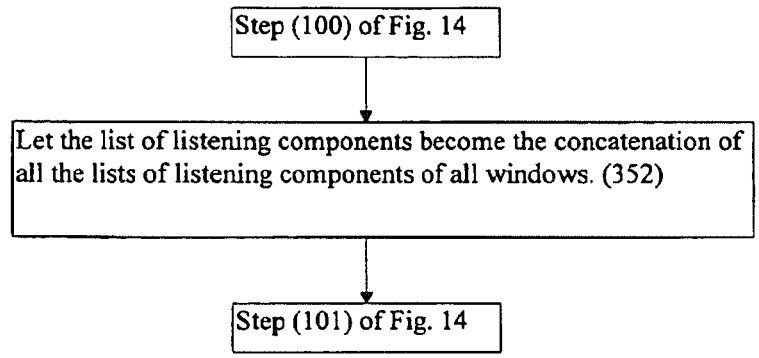

Replace Step (109) of Fig. 14 by (step 353)

> Clear the list of listening components that belongs to the destination window (353)

Fig.34: Mutli-Window Applications

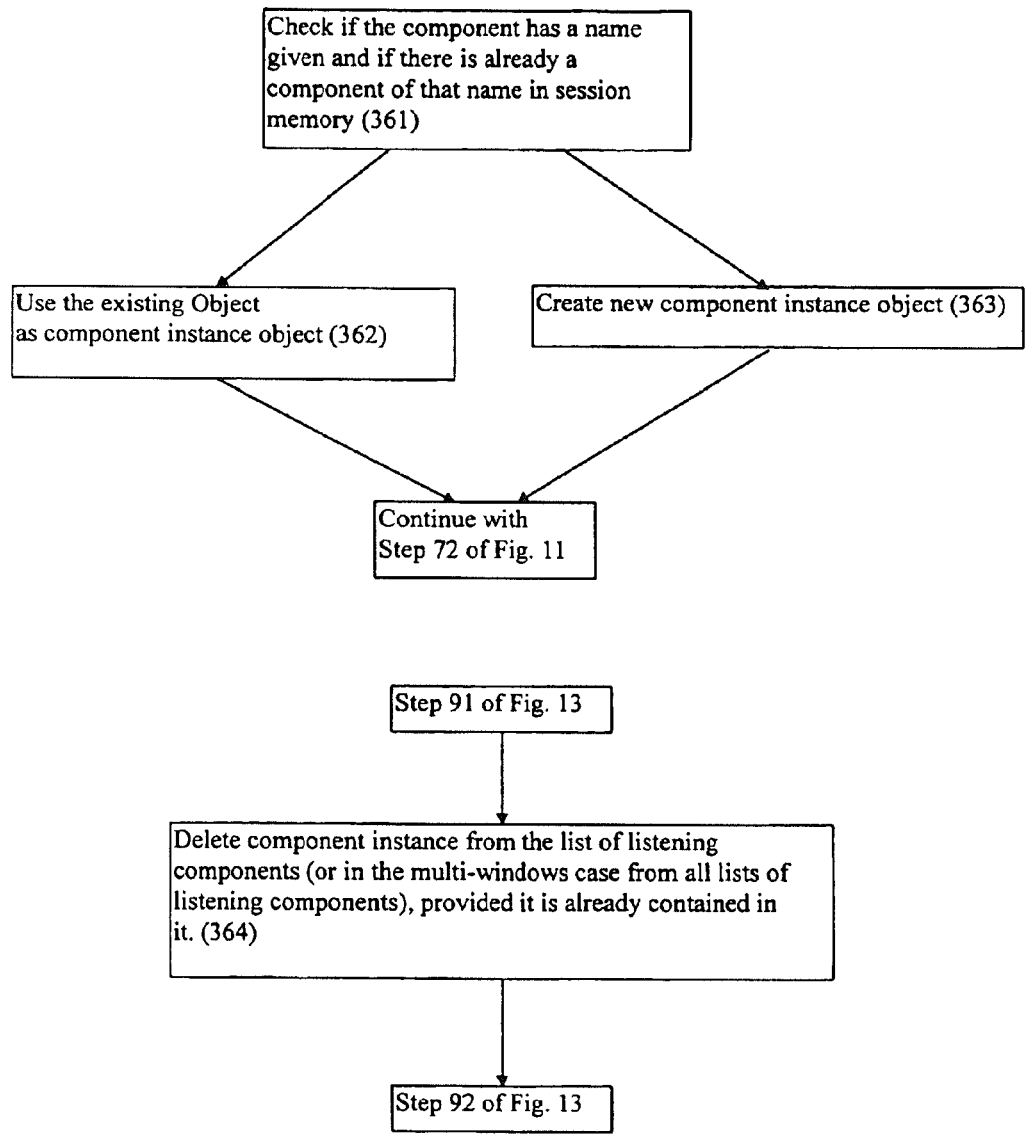
Fig.35: Persistent Components

Session Less ISSC

Session variables like bid counter, and list of listening components become global server variables shared for all users.

Step 109 of page 114 becomes:

> Remove all component objects from the list of listening components that were added longer than a fixed time-out value ago. (371)

Fig. 36: Session Less ISSC

INTERACTIVE SERVER SIDE COMPONENTS

CROSS-REFERENCE TO RELATED APPLICATIONS

This application is a division of Ser. No. 12/218,427, which is a division of U.S. Patent Application Ser. No. 09/449,021, filed Nov. 24, 1999, which claims priority from U.S. Provisional Application No. 60/110,657, filed Nov. 27, 1998, and U.S. Provisional Application No. 60/110,815, filed Nov. 25, 1998.

FIELD OF THE INVENTION

The invention relates generally to software development systems and internet applications, and more particularly, to a method and apparatus for developing and using interactive server side components.

BACKGROUND

1. Web Applications

With reference to FIG. 6, modem internet/intranet technology allows web browsers (13) running on client computers (11) to display internet pages that are stored on server computers (12). More precisely, there is a web server computer (12) connected to a client computer (11) through a computer network. The web server computer (12) runs some web server software (14) and the client computer runs a web browser (13). The internet pages are stored on the web server computer (12). In the classical internet approach, the web server software sends the internet pages unchanged to the browser. Alternatively, the web server can invoke a page generating program (e.g. a CGI-script) or server module (15) that dynamically generates the page, which is then sent to the browser.

Modern browsers (such as Netscape Navigator or Microsoft Explorer) understand that internet pages contain programs or can download and execute programs by some other means. In this way, internet applications can be created that work on client side. We are not concerned here with these kind of applications. The other approach for internet applications generates the pages dynamically on the server computer using page generating programs or server modules. When talking about server side internet/intranet applications, we mean applications working this way. Both server side and client side applications have their advantages and disadvantages, and both techniques are used heavily.

Server side internet/intranet applications can be created by writing programs or scripts that generate web pages to be sent to the client. However, creating these programs requires a lot of rather complex programming effort. In fact, even simple applications must be created by skilled programmers. Texts and graphic design are intermingled with the program code and so must also be maintained by programmers.

Embedded page languages partly avoid this problem by embedding server side programs into internet pages. The output of these embedded programs is inserted into the internet pages. In this way, dynamic content can be realized, i.e., the internet pages contain dynamically changing parts. Examples include page counters or the display of database information. However, all dynamic parts must be programmed. To create truly interactive pages, i.e., pages that react on user input, like database displays with scroll buttons, counters with reset button, shopping baskets, database search forms, data entry forms, etc., embedded page languages require that a processing routine be programmed to handle the user input.

2. Component Technologies

It is a common to build application programs by plugging together off-the-shelf components. Provided that the available components match the problem, applications can be created very quickly this way. In extreme cases, programming can be avoided by using existing components.

In many cases, however, the available components are not flexible enough to create an application that has exactly the desired functionality. Thus, flexibility is very important. The more flexible the components are, the more applications that can be created with the advantages of the component approach.

Component oriented programming enables the user to program or modify components. It is often combined with object oriented technology, which makes it is possible by inheritance to modify components in an efficient way. With component oriented programming, simple applications can be created without programming by reusing off the shelf components, and more complicated applications can be created less expensively because at least big parts can be done using off the shelf components and other parts can be done by user written components.

User written components provide a means to reuse program code several times which in itself is a huge benefit compared to classical programming, where it is known to be difficult to reuse existing parts.

3. Component Technology for Server-Based Internet Applications

We are concerned with the problem of using component based programming techniques for internet applications. There is client based component technology available, such as Active X or Java. In this case, the components are downloaded from the server and then executed on the client computer. Client-based technologies have certain disadvantages (complexity, long download times, security risks, slow connection to the database, etc.) that make server based technology very relevant.

Some HTML editors provide support for a fixed set of components on their pages. This is not component oriented programming since the user can not create his own components, add existing components or freely combine components and programs. Also, components cannot be nested and the number of components per page is fixed rather than dynamic.

4. Editors and Application Development Tools

Typical application programming is a cycle of edit, compile and test. An application programmer writes a program into a text file. From time to time, the program is compiled and the programmer can test to see if the program works as desired. If not, selected program text is changed and the cycle begins again. In this way, the programmer receives feedback on bugs only after compiling and testing. During programming, the developer must imagine how the final program works, which can be difficult and time consuming.

WYSIWYG application development (where applicable) avoids this development cycle. Ideally, the developer always has a running application on screen and can modify it directly. This simplifies development to such an extent that non-programmers can create certain kinds of applications. It is crucial, however, that the application shown during development is as similar to the final application as possible. If the final application is in fact different, users are forced to test the application in the real environment, which introduces a new kind of development cycle and thereby drastically reduces the benefit of WYSIWYG development.

WYSIWYG tools are common for web page design (the layout) but not for web application development. There are fine WYSIWYG development tools for GUI applications. The few WYSIWYG development tools available for server-based internet applications somehow simulate or abstract from the real browser and server environment. They do not really match the production environment with the disadvantage that the users need to test the application in the real environment again introducing a new development cycle. We do not know of tools that provide the user with a running application on screen, that can be edited at the same time.

5. Maintaining State

It is a well known problem to maintain the state of a connection from the browser to the server. In addition it is a problem on several web server architectures to maintain the state information. On some architectures (CGI) the user program stops after servicing a page request and looses all data.

However modern web and application servers provide solutions for these problems. ISSCs work on top of these solutions. We assume in the rest of this description that variables and heap data structures remain available throughout a user session.

OBJECTS AND SUMMARY OF THE INVENTION

It is an object of the invention to provide a tool and a technique to develop server side web applications by composing them out of interactive server side components and placing them on page templates. The technique includes a mechanism to generate pages from such page templates that allows multiple independent and interactive components per dynamic page, and a browser-based editor to place and modify components on page templates.

We call a server-side component interactive if the component upon user interaction can trigger actions on the server. Current approaches are constrained to a fixed set of interactive components per page, while our approach dynamically determines the set of components per page during page generation. This is an essential improvement since a broad range of applications can now be built from components that can not be done with a fixed set. For example, components can be nested allowing inner components to be removed or repeated or the set of components can be controlled by a program. Furthermore, our approach is simple enough to allow programmers to create their own components.

The browser-based component editor allows the user to remotely edit a running application. This becomes possible by a novel approach. The server transforms each page into a new page that contains editing features (like scripts and layout elements) for the page itself. Besides being editable, the page keeps all its normal functions. For the user this means that he can test and edit his application with a single tool, while all current approaches require the user to switch between two views, the browser and the programming tool.

The present invention creates server side internet applications by placing interactive server side components (ISSC's) on internet pages. ISSC's encapsulate dynamic page functions including processing of user responses on the server. Thus, ISSC's can be reused, which drastically reduces programming effort. In order to flexibly create applications, ISSC's can be used on dynamic pages and the number and the kinds of ISSC contained on a single page can change dynamically during page generation.

The ISSC technique remembers information (in form of an ISSC object) on each ISSC during dynamic page generation on the server. It generates HTML code in a way such that when the user triggers an event of a certain ISSC, this event will be sent to the server using a conventional HTTP GET or POST request. On the server, the event is then passed to the corresponding ISSC object. The ISSC algorithm makes sure that all components work without disturbing each other, even when nested or combined. This latter property of the algorithm allows end users to compose applications by freely combining multiple ISSC's.

The ISSC algorithm can be extended to create a browser based editor that can place ISSC's on pages and to modify their properties: During dynamic page generation, scripts and handles are embedded into the page that permit editing of the page itself. Handles mark the position of components on the page. Clicking on a handle invokes scripts that permit editing of the components attributes or allows the user to insert, move, copy, or delete components. The scripts then send change requests back to the server (using conventional HTTP requests) and the server performs the change and redisplays the page. Edit scripts and handles do not interfere with the function of the pages and slightly modify the layout of the pages. Thus, this novel mechanism allows the user to edit a "running web application."

BRIEF DESCRIPTION OF THE DRAWINGS

FIG. 2 is a screen shot similar to FIG. 1 showing handles to identify the components of the database form.

FIG. 4 is a screen shot of the component editor window displaying an edit page.

FIG. 5 is a source code listing of a sample component page.

FIG. 6 is a schematic block diagram illustrating a prior art server based internet application.

FIG. 7 is a schematic block diagram illustrating a server based internet application in accordance with the present invention.

FIG. 11 is a flow chart illustrating the algorithm for the display method of a component class.

FIG. 12 is a flow chart illustrating the handling of the component class for a counter.

FIG. 13 is a flow chart illustrating the registration procedure.

FIG. 14 is a flow chart illustrating the algorithm for processing of components.

FIG. 15 is a flow chart illustrating the handling of the component class for a counter with reset.

FIG. 16 is a flow chart illustrating the handling of the component class for dbinsertpanel.

FIG. 17 is a flow chart illustrating the handling of the component class for dbinsertfield.

FIG. 18 is a schematic block diagram illustrating the component editor.

FIG. 19 is a flow chart illustrating the algorithm for initialization of the component editor.

FIG. 20 is a flow chart illustrating the algorithm for obtaining information regarding a component.

FIG. 21 is a flow chart illustrating the algorithm for the show-handle procedure.

FIG. 22 is a flow chart illustrating the procedure for generating page initialization code.

FIG. 23 is a flow chart illustrating the structure in the client computer for the component editor.

FIG. 33 is a flow chart illustrating the algorithm for generating component text.

FIG. 34 is a flow chart illustrating the procedures for multi-window applications.

FIG. 35 is a flow chart illustrating the handling of persistent components.

FIG. 36 is a flow chart illustrating the handling of the inventive technique independent of a single server user session.

DETAILED DESCRIPTION

A. Overview and Terminology

Figure 1:
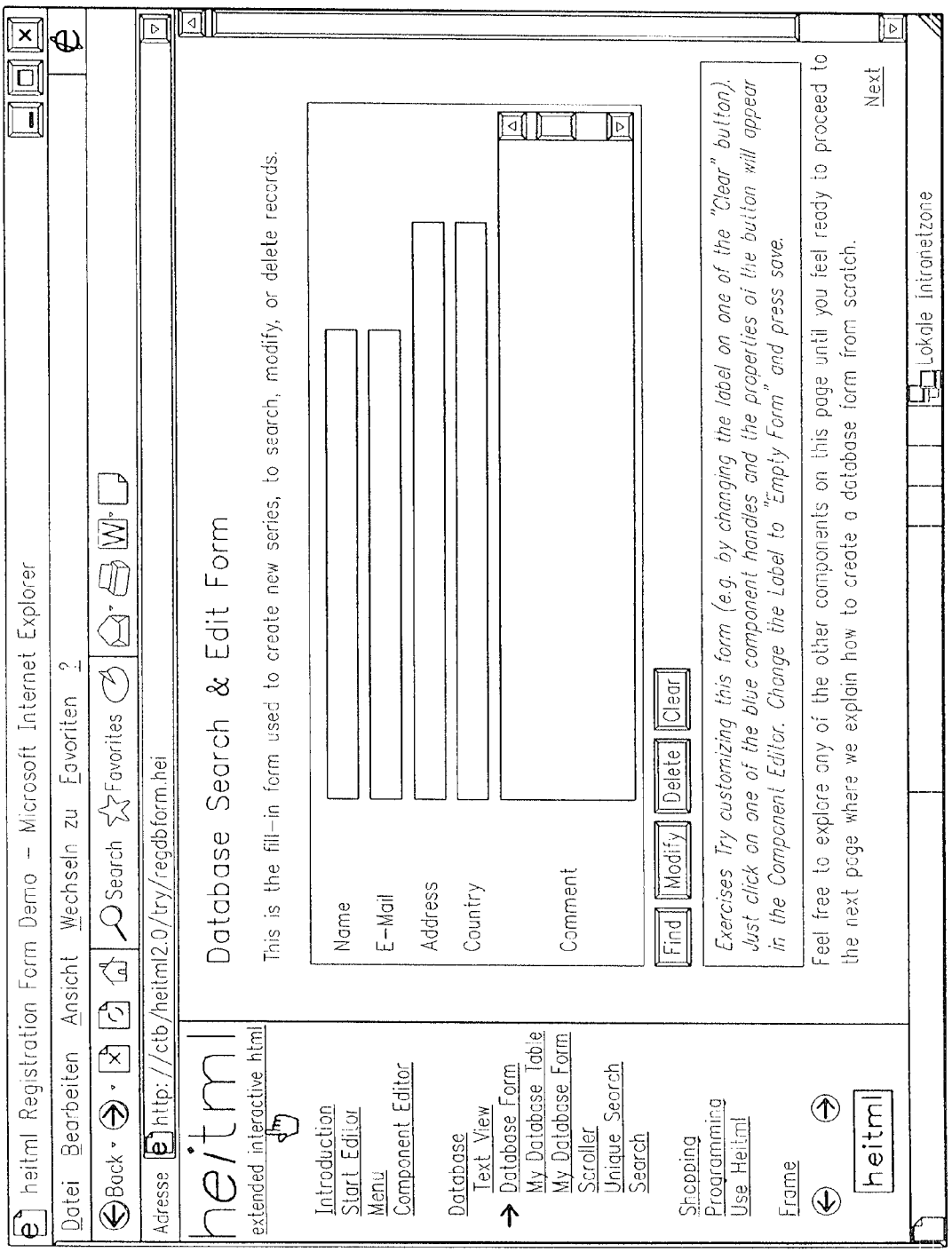
FIG. 1 is a screen shot showing a typical database form.

First, we will explain the terminology, the background information and the rationale of the interactive server side components (ISSC's). Then we shall describe the technique for implementing ISSC's in detail.

1. Component Pages

An ordinary internet page is written in HTML, XML or any other language the browser understands. The page could contain embedded scripts written in Javascript, VBScript, or any other programming language supported by the browser. The code contained on the page is called "browser code" since this code is processed by the browser.

Figure 2:
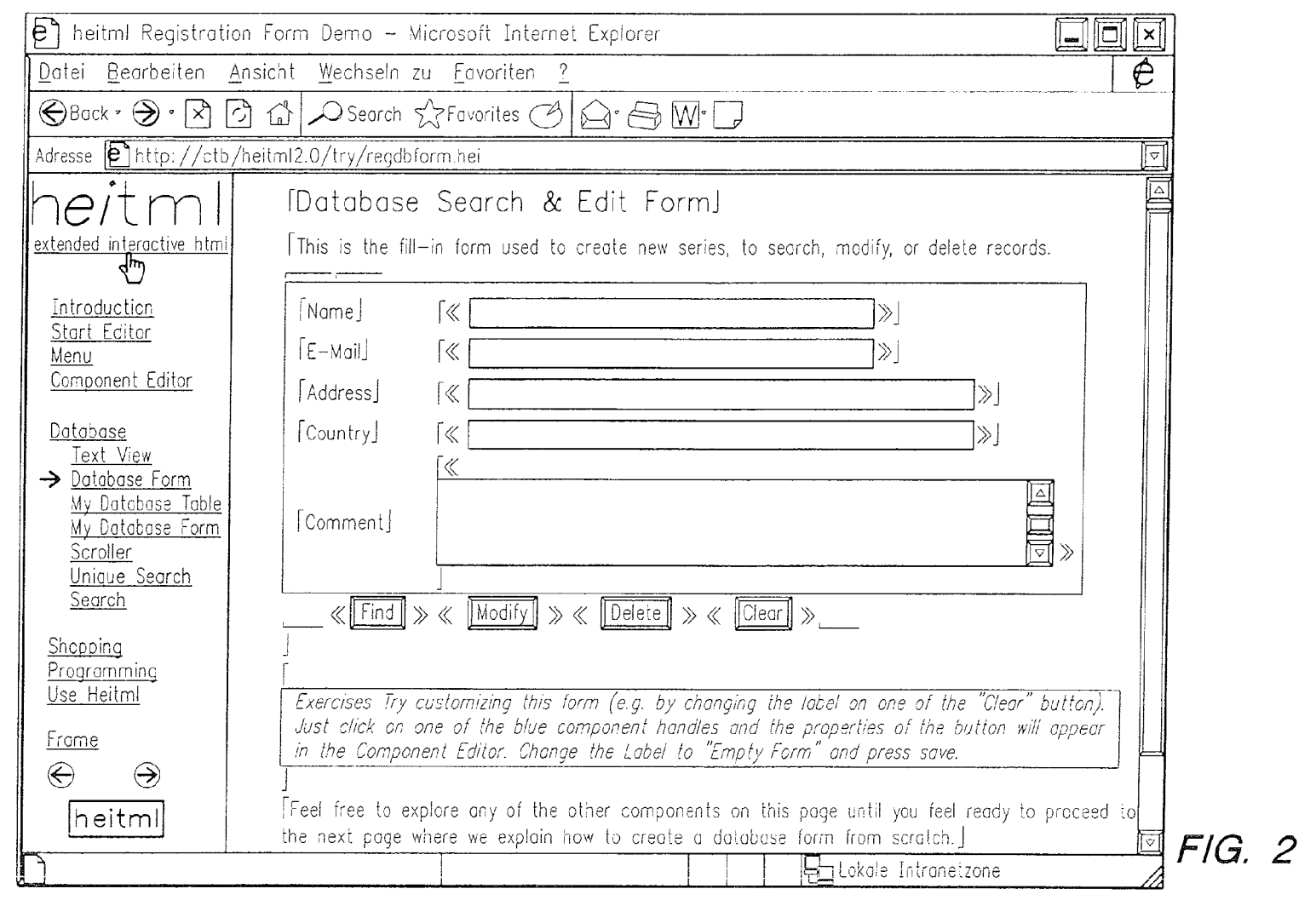

Using a syntax similar to the HTML/XML tag syntax, components can be added to the page. A page with components is called component page. Tags marking components are distinguished from browser code by their tag name. FIG. 2 shows part of the page code of the sample page shown in the introduction. Tags marking components are shown using bold formatting, while browser code is shown in normal formatting. The <dbform>, <dbfieldtext>, and <dbformbutton> tags mark form, field, and button components, while all other tags are ordinary browser code.

Note that the actual syntax used to mark the components on the pages is irrelevant for the invention, but introducing the syntax makes things more concrete and more easy to describe.

Each component marked on a page has a certain component kind (the tag name in HTML terminology) and has attributes. Attributes can be static constants as in XML or HTML or dynamically evaluated expressions.

There can be several components of the same or different kind on a single page. Components can be nested inside each other, i.e., a component can have a content containing browser code and other components. For example, <dbfields . . . > are nested inside a <dbform . . . > in the example of FIG. 5. We use HTML/XML-like elements with end-tags to express nesting syntactically.

Please note that putting a component tag on the page is all that needs to be done to enable the component. Especially it is not necessary to implement a separate program that handles the input of a form or reacts on the user pressing a button. Instead, the components are interactive and can operate automatically on user input.

By adding components to a page, the page becomes a dynamic page or server side application. A page might display different content when requested several times. For example, a database component displays the current database content, which may change anytime. The page we get by viewing the page a single time is called an instance of the component page.

2. Component Classes

Before components of a certain kind can be used, they need to be programmed. However, after a component kind is programmed it can be used on as many pages as desired without additional programming. A component can be programmed in any programming language, but it is preferred to use an object-oriented language. For each component kind one class (or subprogram in non-object oriented languages) needs to be programmed. We refer to this class as the component class.

The component class contains several methods, most significantly the display method. The display method generates browser code, such as HTML, Javascript, XML, or whatever the browser understands, that displays the component on the browser screen. Interactive components have other methods to react on user interaction.

A product incorporating ISSC's will preferably include predeveloped components and as well as providing a means for the user to program his or her own components. These can be based on existing components by inheriting from existing component classes.

3. The Setting

The preferred system structure is shown in FIG. 7. To use web pages containing ISSC's (26), the server computer (22) must contain an ISSC processor program (25) and component classes (27) for all components used.

When a client browser (23) requests a component page (26) the web server program (24) calls the ISSC processor (25). The ISSC processor program then reads the component page and generates a browser page by using the component classes. The generated page is passed to the web server (24), which sends it to the client browser (23). A detailed description of this process and how it interacts with the algorithm used in the ISSC processor is given below.

4. Features of ISSC

A general goal of ISSC's is to allow non-programmers to create powerful applications while at the same time providing programmers with great flexibility in creating applications. This is particularly advantageous for non-programmers since components can be deployed with zero programming and the component tags are as similar as possible to HTML/XML tags.

ISSC's support the development of components with at least the following features. Feature 1 is that components are interactive, i.e., they can react on user input. It is essential to use at least some interactive components in an application, since very few applications simply display information without processing user responses. For example, while a web counter is non-interactive, a web counter with reset button is interactive since the user can click on the button and the counter needs to react. The database form shown in FIG. 1 is also interactive since the user can press a button and send the form data set to the dbform component, which then stores it into the database.

Feature 2 is that components can be nested, i.e., they can contain other components. Syntactically, this is expressed by HTML/XML elements with end-tag. The content, i.e., the text between the tag and the end-tag, typically consists of browser code and other components. Nested components significantly improve flexibility since components can be flexibly combined. For example, a form contains fields as shown in FIG. 5, and a database scroller or a shopping basket contains components defining the layout.

Feature 3 is that components with non-empty content can decide where and how often the content is displayed. It can be once, never, or multiple times. For example, a database scroller displays its content multiple times, once for each database record, or never if there was no result. Conditional components can decide to include the content based on a certain condition. This feature is essential for dynamic component structures on pages.

The following features of ISSC's are technical constraints imposed by the internet. It is clear that these are essential to create a working system. Feature 4 is that the internet works on a page by page basis, rather than an event action basis as used in current GUI systems. Feature 5 recognizes that the internet is an unsafe environment. There is a risk that users might fake their browsers in order to work differently than intended. This means that all security checks need to be done on the server. For example, it is not sufficient to disable a button in the browser to disable a certain server functionality because users may add the button by manipulating the browser.

The following features are necessary to make component tags behave naturally, like HTML/XML tags. Feature 6 is that multiple components of the same or different kind work without interference on a single page. Feature 7 is that a component works even when used inside another component. Because of Feature 3, this means that the component can be deleted (because the enclosing component decided not to include its content) or it can be displayed multiple times.

Lastly, Feature 8 allows programming whereby the implementation of a component can dynamically decide to make use of other components.

5. Component Instances

The set of components directly marked in the text of a component page is called the static set of components. As explained above, component pages are dynamic and therefore components might be displayed differently for different page requests. Also, the browser code on the page and the number and kind of components can change dynamically. Each component can have one, zero, or multiple component instances that are actually displayed.

Because of Feature 3, a component can remove its content from the page or it can display it multiple times. This means that the browser code and the components are removed or displayed multiple times. Therefore, a component inside a component can have as many component instances as the frequency that the content is displayed. A typical example is a database field <dbfield . . . > component contained in a table of database records. It is displayed for each database record shown on the screen, which could be several, one or none. A <dbfield . . . > component on a component page expands into several <dbfield . . . > component instances, one for each record displayed. Because of Feature 8, it is possible that during display of a component, new component instances are dynamically added to the page.

6. Interactive Components

Interactive components are a significant feature of the invention. Non-programmers are unable to program processing routines that are normally required to process user input. However, non-programmers can use components. Therefore, interactive components provide a way for non-programmers to create server side interactive web applications.

The interactive components are also a great benefit to programmers because they encapsulate the display and the processing of responses into a single object. This results in a better program structure and makes it much easier to use components, thereby allowing the programmer to create new components by inheriting from existing component classes.

An interactive component shows up in the browser with user interface elements the user can manipulate or some other means to receive user input. When the user interacts, information is stored in the browser and sent to the server with the next page request. The ISSC model makes sure that the information is sent to the right component instance on the server to perform the desired action.

The interactive component produces browser code in order to display it, just like any component. In the case of an interactive component, the browser code contains code to make the browser collect user input and to eventually send it to the server. Often, an interactive component contains buttons to be pressed or fields to be filled out. An interactive component can also program the browser to wait for keystrokes and to send them to the server.

6a. HTML Browser

The interactive user interface elements most commonly used in HTML are links and forms with form controls. An interactive component can contain links. When the user presses a link, the component instance waiting on the server is triggered and it performs an appropriate action. For example, a database scroller component could have a scroll button that is realized as an HTML link. Clicking on the button makes the component scroll.

Technically, clicking on the link causes the browser to send a page request to the server. The ISSC technique then makes sure that the right component method is called to process the user interaction.

In the case of forms, things are more complex. Filling out the field usually does not cause the browser to send a request to the server. Thus, interacting with a form field component does not immediately result in a server action. Instead, all information entered is collected by the browser and sent to server completely as the form data set when a submit button is pressed. Therefore, the form data set can contain information for several components and trigger actions of several components.

6b. Other Browser Functionality

Current browsers can do a lot more than just HTML, e.g. process scripting languages. How the browser functions is not important for the ISSC technique. It is important, however, that the component produces some browser code that causes the browser to collect certain user interactions and to send the interactions to the server in a specific way. In HTML, these are realized with links and form controls like fields and buttons. In Javascript, there are many more choices, including pop-up boxes and capturing keystrokes.

6c. Component Data

In order to handle user input and to perform actions, a component instance in general needs to have the data that was calculated during display. For example, a delete button needs to know which database record to delete; a field needs to know where to store its content; and a scroll button needs to know what set of records to scroll. We solve that problem by creating an object (of the programming language), namely the component object, when a component instance is created. This display routine and all action routines are methods of the component object and can access fields of the object to store their data.

To store the component objects between page accesses, ISSC's are based on a programming language/web server/application server that keeps the object available between different page requests.

6d. Component Identification—Bid

Each interactive component instance gets an unique identification called bid. The bid must be unique at least within a session. When the browser sends information about user interaction to the server, it must include the bid of the addressed component. More precisely, the components must program the browser to include the bid into subsequent page requests.

In the special case of HTML, a component must include the bid into the name of each form control generated. We do that by adding the bid followed by a point to the name of the form control. When the user submits a form, the form data set is included in the request as name-value pairs. Since the name of each form control includes the bid, the ISSC processor can consult the bid to find out the component instance that contains the form control. When adding URL parameters to the link of an URL, parameter names must also be prefixed with the bid.

With other browsers there might be another way to include the bid into a page request, but the underlying principle is the same.

7. Preferred Embodiment Implementation Language

The preferred embodiment of the ISSC invention is implemented in the heitml programming language which is a page template language as well. In this embodiment, heitml is used for the component pages and heitml features are used to mark components. It is noted, however, that the ISSC invention is not dependent on it's the choice of implementation language and it is not dependent on a particular way for marking components on component pages. The heitml language was developed by the present inventor. heitml versions up to 1.2 are in the prior art. New features of heitml version 2 are described below.

B. The ISSC Processor

1. The ISSC Processor

FIG. 7 shows how the browser program (23) running on the client computer, the web server program (24) running on the server computer, and the ISSC processor (25) are connected, and it gives an indication of the data flow. The web browser and web server programs are well known programs which are within the skill of one in the art, while the ISSC processor contains the newly invented techniques.

Figure 8:
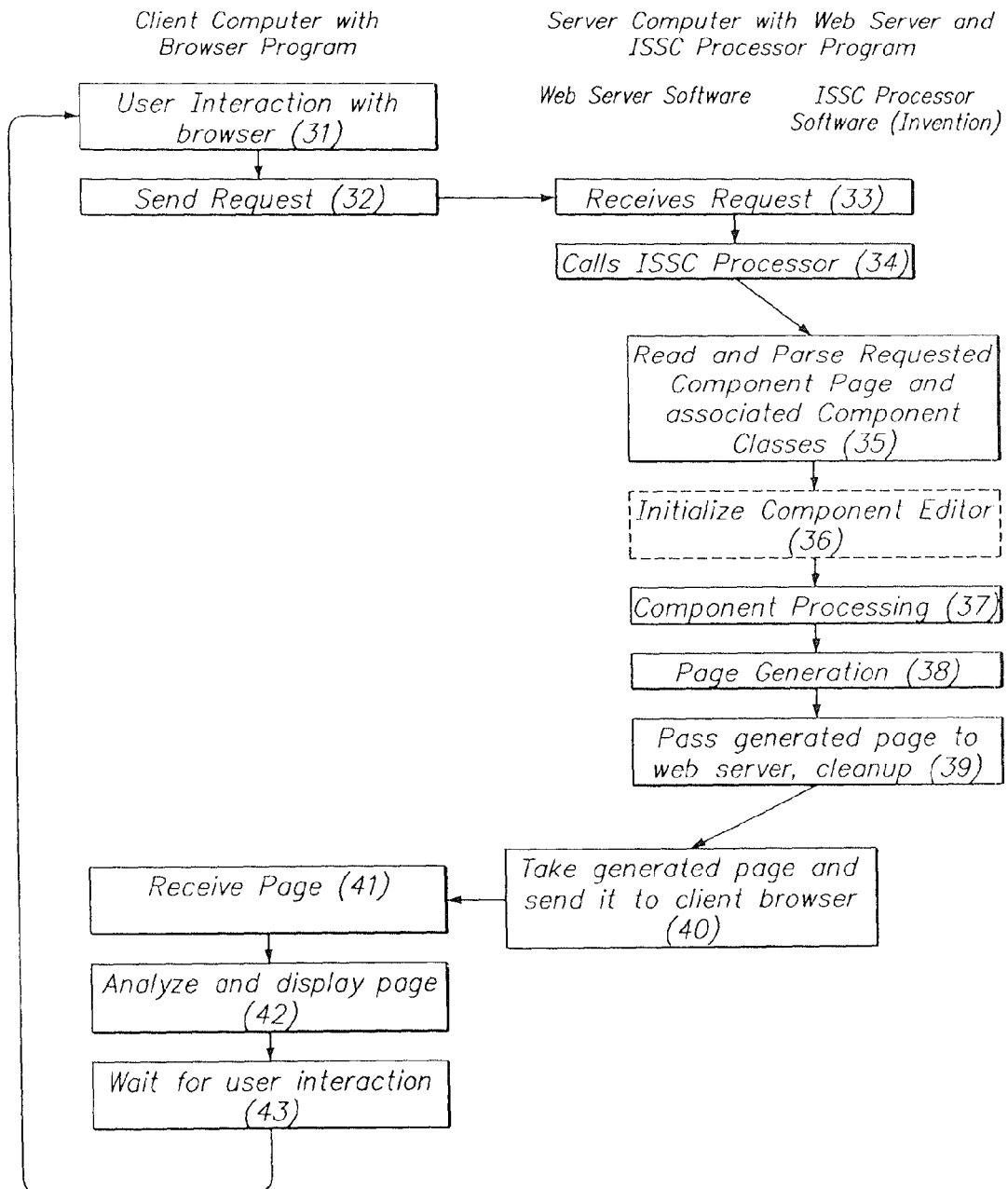
FIG. 8 is a schematic block diagram illustrating the functional interaction of the client computer and the server computer.

FIG. 8 is a flow chart describing what happens and in what order. Initially, the user invokes a web browser on the client computer and interacts with the user interface of the browser to select a page possibly being a component page (31). The browser sends (32) a request to the web server. The web server receives and analyzes (33) the request, and when a component page is requested, the web server calls the component processor (34). Most web servers available today can be parameterized to do this.

The ISSC processor then reads and parses the requested component page (35) resulting in an abstract syntax tree (AST). The component editor is then initialized (36). This step is required only for the component editor, see section C below.

The ISSC processor evaluates the parameters of the request and determines if the user wants to interact with any components. If so, the component(s) are called to process the user input (37). The ISSC processor then processes the AST of the component page according to a page generation method. The result is a browser page (38).

Then the ISSC processor cleans up all unused component objects and saves all other objects for subsequent page requests (39).

Finally the generated page is sent to the web server (39), in turn sends it to the client browser (40). The browser then receives the page (41) displays it (42) and waits for further user interaction. (42)

Note that only steps (35)-(39) are performed by the ISSC processor. We will now describe them in detail.

2. Page Parsing

The web server passes the file name (or any other identification) of the component page to the ISSC processor. The ISSC processor then reads the component page (usually from a file, but it could also be stored in a database or in any other way) and parses it. This means it finds out what tags on the page mark components, i.e., those tags that have a component class with the same name. The result is an abstract syntax tree (AST). Parsing is a well known and well understood technology. Anybody skilled in the field of compiler construction and parsing can construct the parser required for the ISSC technique.

The AST contains two kinds of nodes, one for browser code and the other one for components marked on the page. Browser code nodes contain the code and component nodes contain the name of the component and its attributes. The page is represented as a list of nodes called cb-list. Each node representing a component with content in turn contains a cb-list that represents the content of the component. In terms of a tree, the cb-lists connect all the children of a node or of the tree root.

Figure 10:
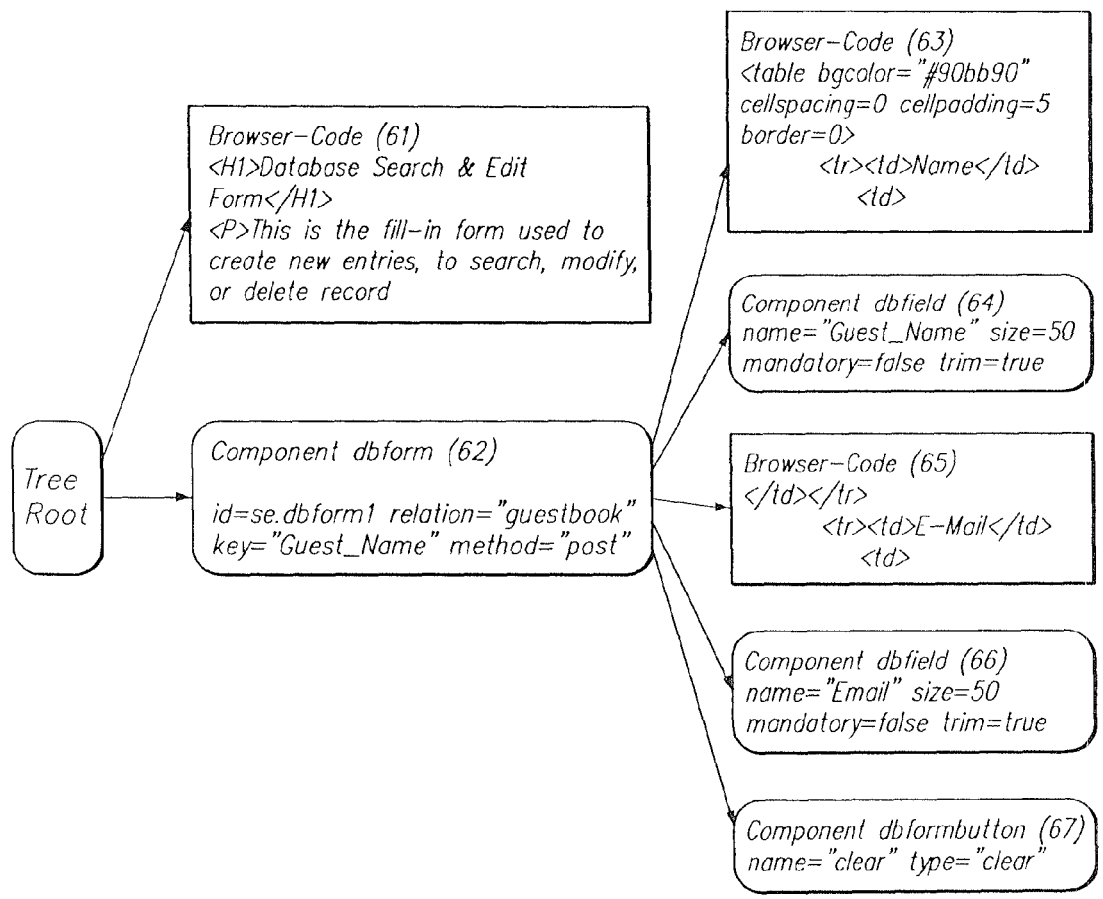
FIG. 10 is an example of an abstract syntax tree for the present invention.

FIG. 10 contains an example AST for the component page shown in FIG. 5. The page consists of some browser code (61) followed by a <dbform . . . > component (62). The <dbform . . . > component in turn contains browser code (63),(65) with dbfield (64),(66) and dbformbutton (67) components. The middle and the right column of FIG. 10 are cb-lists. The middle column shows the cb-list representing the page with elements (61) and (62). The right column cb-list represents the content of the <dbform . . . > component and has the elements (63) . . . (67).

3. Component Editor Initialization and Component Processing Algorithm Postponed

The component editor and all its procedures are described in section C below. The techniques described here can be understood and work without a call to the component editor. If the component editor is switched off, the calls to the component editor have no effect. This is why all calls to the component editors are shown using boxes with broken lines in the drawing.

For the ease of description, the component processing technique will be introduced later. For an initial request of a component page, the component processing does nothing. The component processing algorithm starts to work only after the user interacts with a specific component, e.g. by pressing the button of the component. This can happen only after the component was already displayed by an initial page request.

4. Generation Algorithm

Figure 9:
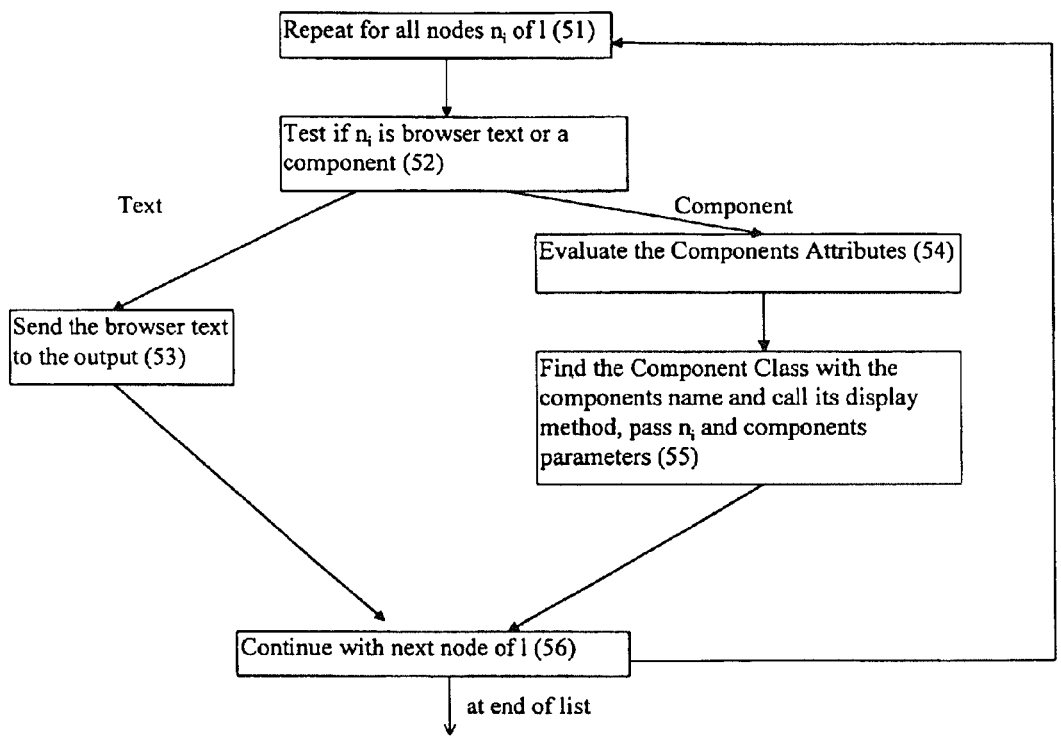
FIG. 9 is a flow chart illustrating the algorithm for page generation.

FIG. 9 is a flow chart of the page generation algorithm. It is a recursive algorithm taking a cb-list as parameter 1. The cb-list 1 is processed node by node (51). If a node represents browser code (52), it is sent to the browser unchanged (53). If a node represents a component (52), the attributes of the component are evaluated (54). Then, the component class of the component is identified, i.e. the component class with the name of the component kind taken. The display method of the component is called (55). Processing continues with the next node of the component list (56).

Note that in case of a component with an end tag, processing continues with the component or browser code after the end tag. In this way, the content of the component is skipped, unless the display method of the component recursively triggers the generation algorithm for the content of the component.

5. Component Class—Display Method

The page generation algorithm calls the display method for each component. More precisely, it evaluates the kind of the component, selects the component class with that name, and then calls its display method.

The display method implements a big part of the functionality of each component. In fact, all display methods are different depending on the functionality of the component. However, we will describe the basic structure of the algorithm as used for most interactive components.

The basic structure of a display method is given in FIG. 11. The boxes with round corners are filled out differently for each component. First, a component object is created in step (71). Depending on the programming language, this often happens implicitly by declaring the display method to be a constructor method. Information on the component needs to be passed to the component editor by calling the Component-Information procedure in step (72). Then, for interactive components, the registration procedure of the ISSC processor is called in step (73). This method assigns a bid and registers the component object to receive messages.

Using an object-oriented language, step (72) and possibly also step (73) can be inherited from a suitable base class. Thus, step (74) is actually the first thing that needs to be programmed by the user writing a component class.

Depending on the functionality of the component, HTML code is generated that displays the component in the browser in steps (74), (76) and (78).

The procedure Show-Handle needs to be called for component editing in steps (75) and (77). However, these steps have no effect if the page is not displayed in edit-mode.

The code recursively calls back the Generate method of the ISSC processor in order to call the generation algorithm for the content of the current component. The display method is free to not call the Generate method, and to delete the content and all components therein. the code can also call the Generate method multiple times. Whenever the Generate method is called, new browser code is generated for the content and new component objects are created for all components contained in the content.

The display method is free to create subcomponents by calling display methods of the appropriate component classes.

The component might also generate HTML code to display form controls, such as fields or buttons. All names of field controls must start with the bid followed by a point, as described earlier.

6. Example Component: Counter

FIG. 12 shows an example component class for implementing a web counter. The counter class has a single method, namely the display method. Since the component is not interactive, there are no other methods. The class inherits from class component in step (81), and therefore steps (71) and (72) of the display method of FIG. 11 are inherited. The registration procedure is not called since the component is not interactive, so step (73) of FIG. 11 is not needed.

The display method then calls the Show-Handle routine in step (83). The counter value is read from the database in step (84). Because there can be several counters in the database, the component accepts a counter name (cname) as a attribute. It is used to distinguish the counters in the database. The browser code is generated to display the counter value in step (85), which in HTML means just to print the value (unless special formatting is needed). Then, the counter in the database is incremented in step (86) and the end handle is displayed in step (88).

7. Registration Procedure

The registration procedure shown in FIG. 13 is called by the display method to indicate that a component object is ready to receive user input. Registration inserts the component instance into the list of listening components and assigns a new bid to the component instance.

Generation of the bid is a simple process. The ISSC processor maintains a global bid-counter. The bid is constructed by the component kind (as an identifier string) followed by the counter value in step (91). The bid contains the component kind just for debugging and documentation purposes. Then, the counter is incremented in step (92) and the component object is inserted into the list of listening components in step (93).

To make the bid unique within a session, the bid-counter must not be reset between page accesses.

8. Cleanup

After completion of the generation algorithm, all component objects that wait for user input were stored in the list of listening components by the registration procedure. The list, all component objects therein, and all referenced data objects are stored until the next page access. Also, the value of the bid-counter must be kept. All other objects that are not referenced any more are cleaned up. This is usually handled by a kind of garbage collection done by the underlying system.

9. Component Processing of the ISSC Processor

In case of an HTML form submission, the browser sends the form data set together with the request. It is an encoded list of value name pairs indicating the values of the form controls. This is the case regardless of the protocol or of the HTTP-Method used; only the actual encoding is different for GET and PUT HTTP-Methods or other protocols used.

Because of the form control naming scheme, each form control name starts with the bid of the component that displayed the form control followed by a point. Thus, the ISSC-processor finds out using the bid to what component instance the value should be sent. All component instances whose bid is contained in the request are addressed by the request.

Component processing works as a two phase process. First, the ISSC processor calls the check method of all addressed components. If none of these lead to an error, the ISSC processor calls the process method of all addressed components.

FIG. 14 shows a flow chart of the algorithm. First, the value name pairs of the form data set are sorted according to the name in step (100). Since the name starts with the bid, this creates groups of name-value pairs with the same bid. Then, we loop through each of these groups in step (101). Based on the bid, the associated component object is looked up in the list of listening components (step 102). If found, the check method for that object is called (step 103). The check method receives as input the group of name-value pairs and it returns either "OK" or an error. Using the state variable (step 104), the algorithm determines if any check routine returned an error. If there was no error (step 105), all groups of name-value pairs are again processed. This time the process method for each component object is called (step 108).

10. Check and Process Methods

As explained above, the component processing algorithm calls check and process methods of the component classes. If the user reacted on an interactive component, then the ISSC processor calls the check and process methods of the appropriate component class. Check and process methods receive the parameters supplied by the browser.

Check and process methods need to be developed completely by the component programmer. We give illustrative examples below.

The check method is called first and should determine whether the requested action can be completed without an error. Unless a check of any component did report an error, the process method is called to actually perform the desired function. It is possible that multiple components are selected by the user. For example, by submitting an HTML form, several field components are submitted. In the case of multiple components, first all check routines are called and then, only if everything is OK, all process routines are called.

Check and Process receive the group of name-value pairs of the form data set that are intended for that component instance, i.e., all pairs whose name starts with the bid of the component instance. The string bid followed by the point is stripped of the names before the pairs are passed just to simplify programming.

11. Example Interactive Component Class: Counter with Reset

FIG. 15 shows an example of an interactive component class implementing a web counter with a reset button. The reset button is realized as a link containing the word reset. When the user clicks on reset, the counter is reset to zero.

The display method is similar to the counter component shown in FIG. 12. In addition, the display method calls the registration procedure (step 112), shows the reset-link (step 117) and saves the counter name (step 119).

The reset link (step 117) links back to the same page and it passes a parameter named "bid.reset" to the server, where bid is the bid of the rcounter component instance. It asks the ISSC-Processor about the URL of the current page to include it into the URL. Step (119) copies the component name into the component object for use of the process method.

Clicking on the reset link, causes the same page to be redisplayed. However component processing calls the check and process methods of the component, because of the 'bid.reset' parameter The check method returns "OK" simply because there is no error possible. The process method sets the counter to 0 and uses the counter name stored in the component object to identify the counter.

12. Example Component: dbinsertpanel and dbinsertfield

A dbinsertpanel contains several dbinsertfields. The dbinsertfields show up as HTML text fields. When a dbinsertpanel is submitted, the content of all the contained dbinsertfields is written into the database. A dbinsertpanel must be enclosed in an HTML form and the HTML form must have a button to submit it. The dbinsertpanel receives the database relation name as parameter. dbinsertfields have the field name and size as parameters.

The process for handling a dbinsertpanel class is shown in FIG. 16. The display method creates the object (step 131), calls the registration procedure (step 132) and shows the handles (steps 133 and 136), just as with the counter with reset. Then, it uses a global variable curpanel to store itself. In this way, dbinsertfields contained inside can access the component object. A list of field names "this.fieldlist" is initialized to an empty state and the relation name is saved in the component object (step 134). Then, the content of the dbinsertpanel is included by recursively calling Generate (step 135). This calls the display methods of nested dbinsertfield components.

Handling of the dbinsertfield class is shown in FIG. 17. The dbinsertfield component is not interactive in this implementation. Instead, fields belong directly to the dbinsertpanel and use the bid of the panel. Steps (151), (152) and (155) are the same as with the counter component. In step (153), the field inserts its name into the field list of the enclosing dbinsertpanel. Thus, after complete processing of the content of the dbinsertpanel, the fieldlist contains all field names. In step (154), an HTML input field is generated using the bid of the enclosing panel.

Because the dbinsertpanel is interactive it has check and process methods. Check is trivial in step (140) of FIG. 16. The process method (141) receives the group of name-value pairs of the form data set that is intended for this component as parameter. The process routine then executes an SQL statement. The relation name is available in the component object and so is the list of field names. The field values are given as the group of name-value pairs supplied as parameters.

The field list is required so that fields faked by a user manipulating the browser are not stored in the database. Otherwise the name-value pairs supplied to process were enough information.

Note that because of the features of our invention, there can be multiple dbinsertpanels in a single HTML form working independently without problems! So several database records can be written from a single form.

13. Multi-Window Applications

The main algorithm assumes that only one browser window or frame is used. The main problem when using several windows or frames is the list of listening components. This list is supposed to contain all the components that are currently visible in the browser and which could send a message back to the server. The single window algorithm completely clears the list of listening components when creating a new page since all component instances in the browser will be replaced by a new page. This is no longer the case when several windows or frames are used, since a page request replaces only the component instances of a single browser window or frame.

To handle several windows or frames, the algorithms are modified to use several lists of listening components, one for each window or frame. Each page request has a destination window/frame, i.e., the window or frame the resulting page is to be displayed in. The page generation algorithm is modified to use the list of listening components of the destination window/frame instead of the single list of listening components used before.

FIG. 34 shows in step (351) a replacement for step (93) of FIG. 13, which is the only step where the generation algorithm accesses the list of listening components.

The component processing algorithm of FIG. 14 is modified to work on all lists of listening components. This is accomplished by concatenating all lists of listening components before step (101) of the algorithm. Thus, step (352) is inserted before step (101). Then in steps (101) through (108), the concatenated list is used. In step (109) only the list of listening components of the destination window is cleared; step (353) illustrates this modified step. Finally, the clean-up procedure must be modified to retain the multiple lists of listening components instead of the single list.

14. Persistent Components

In the basic model, each time a page is requested, component objects are created for all components on that page. This means that even if the same page is displayed again, new component objects are created. This is fine with the ISSC technique since a component exists only as long as it can accept user input, however, when programming components, it is sometimes useful to keep the identity of an object for a longer time.

This is no problem with the ISSC model. A display method is not required to create a new component object, but an existing one can be reused instead. For example, components can have a name parameter. FIG. 35 illustrates a modified version of the display method of FIG. 11. The display method of the component looks into a global session wide associative array to find out if there is already a component object with that name (step 361). If so, the display method takes this object (step 362) rather than creating a new one (step 363).

This is actually no change in the basic algorithms presented but just another way of implementing a component class. However, the following single change needs to be made in the Registration Procedure of FIG. 11. After step (91), another step (364) must be added that deletes the component instance from the list of listening components in case it is already contained in the list.

15. Working without Session and Session Memory

As described, the ISSC model works on top of a session system which keeps session data persistent during a user session. Alternatively, it is possible to create bids that are unique for all component instances created on a single server. In that way, session and session memory are not required, but components can be identified by the bid alone.

In order to implement this change, the bid counter must be a server global shared variable (probably protected for multiple shared access) that is global for every process generating ISSC pages. Also, there must be a global list of listening components shared for all users using the server (probably protected for multiple shared access). In addition, the global list of listening components is not deleted at the end of the component processing algorithm. Instead there is an expiry mechanism that deletes component objects based on an expiry condition, for example, if an object was not used for a certain time period. Thus, the version of the ISSC algorithm which works best depends on the underlying web server system and its ability to provide session memory and global memory.

16. Alternative Component Processing Algorithm

The alternative component processing algorithm is different and in most cases weaker than the main algorithm presented. It has the following restrictions: (1) the display method of a component with end tag must call generate for the content exactly once; (2) display methods may not call display methods of interactive components; and (3) data stored in Component Objects is not preserved.

The advantage, however, is that sessions and session memory to store component objects is not needed Note that in contrast to the method described in section 15 above, no server memory is needed at all.

The differences between the main algorithm and the alternative algorithm are: (1) there is no session memory required, so neither the bid-counter nor the list of listening components are available when processing starts with another page; (2) the bid-counter is reset at the beginning of processing of each page; (3) before step (100) of the component processing algorithm, the list of listening components is created from the abstract syntax tree in the following way:

The abstract syntax tree is traversed just as in the generation algorithm. For each component node of a component class, a new component object of that component class is created by calling the create method. Create is an additional method that needs to be supplied by the programmer of a component class. A parameter create receives the known attributes of the component. Create must call the register procedure in the case of an interactive component, which assigns a bid and inserts the component into the list of listening components. Finally, after the traversal, the bid-counter is reset.

Because of the above constraints, the component objects will be created with the same bids as the initial page generation algorithm. Thus, the list of listening components is reconstructed but loses component data. However, component processing still works with the reconstructed list.

It is also possible to intermingle the component processing and the reconstruction algorithm into a single algorithm using a simple program transformation.

C. Component Editor

The component editor invention introduces a new architecture and various algorithms for WYSIWYG editors in a browser based environment. It can be used to edit arbitrary pages provided they can be displayed using a sophisticated programmable browser, such as a current internet browser. The basic idea is to inserts scripts into pages so that they can be edited inside the browser.

The advantages of the component editor are: (1) normal pages as well as component pages can be edited; (2) the editor works fine over a network—all pages can be stored on the server; and (3) displayed pages stay completely functional while being displayed and edited.

Editing of components is very important since non-programmers can create applications by reusing existing components provided they have a means to edit component pages in an easy way. The component editor provides this easy way to edit component pages and so becomes a good application development environment.

Storing the page on the server rather than on the client is relevant in many internet applications where it is burdensome to install an editor on every client computer. An example is users of web hosting providers that want to install and maintain a few components on their virtual web sites or corporate intranets that should be maintained separate from many client computers.

It is most desirable that during editing the component pages look and work just as the final pages do. This is important for efficient WYSIWYG development.

1. Overview

The basic idea is to use the browser itself to display a page for WYSIWYG editing. An editor-processor takes a page and transforms it into an edit-page. The edit-page almost looks like the original page, but in addition contains scripts and user interface elements to permit editing the page itself.

FIG. 1 shows a normal page with a database search form and FIG. 2 shows the corresponding edit-page. The edit page contains handles and scripts. By clicking on the handles, the elements on the page can be edited. The scripts are an invisible but important part of the editor implementation.

FIG. 18 illustrates the editor process. A page (161) is transformed by the edit processor (162) into the edit-page (163), which is displayed by the browser (164). The edit-page contains user interface elements and scripts that enable editing of the page. In addition, there is the component editor client part (165) that consists of several pages and scripts that cooperate with the edit page to implement the editing functionality.

Since the page may be stored on the server, the client part of the component editor can not access it directly, but from time to time sends editing commands to the component editor server part (166). The server part will then modify the page and in cooperation with the client part initiate a reload of the page to reflect the changes.

It is easily possible to run such an editor across the network by running the server part on a server computer and the client part a client computer. The edit processor can either run on the server computer or on the client computer. Because reloading the page and the interaction between client and server part are not too frequent, working across a slow network like the internet is possible. It is, however, also possible to run the complete editor on a single machine by running the browser and the server part on a single computer.

Because the pages are displayed with the usual browser, pages in edit mode are displayed and work (in case of embedded scripts) very similar to the final pages.

2. ISSC's and the Component Editor

Although the editing method described above is independent of the ISSC model they are closely linked. The main advantage of the editing method is component editing of pages containing ISSC's. The implementation of the edit-processor is integrated in the ISSC processor and makes use of features of the ISSC model.

In fact, the integration of the ISSC processor and the edit-processor makes it possible to edit components on the pages. Because the pages displayed in edit mode are processed by the same ISSC-processor in the same environment (on the server), they stay fully functional and work as the pages outside the editor.

Since the edit-processor is integrated with the ISSC-processor it is specialized in editing ISSC's. To edit HTML tags, we pack them into components by writing a component class whose display routine displays the HTML tag itself. This does not effect normal page processing but during edit-mode the tag can be edited like a component.

3. The User Interface of the Component Editor

Figure 3:
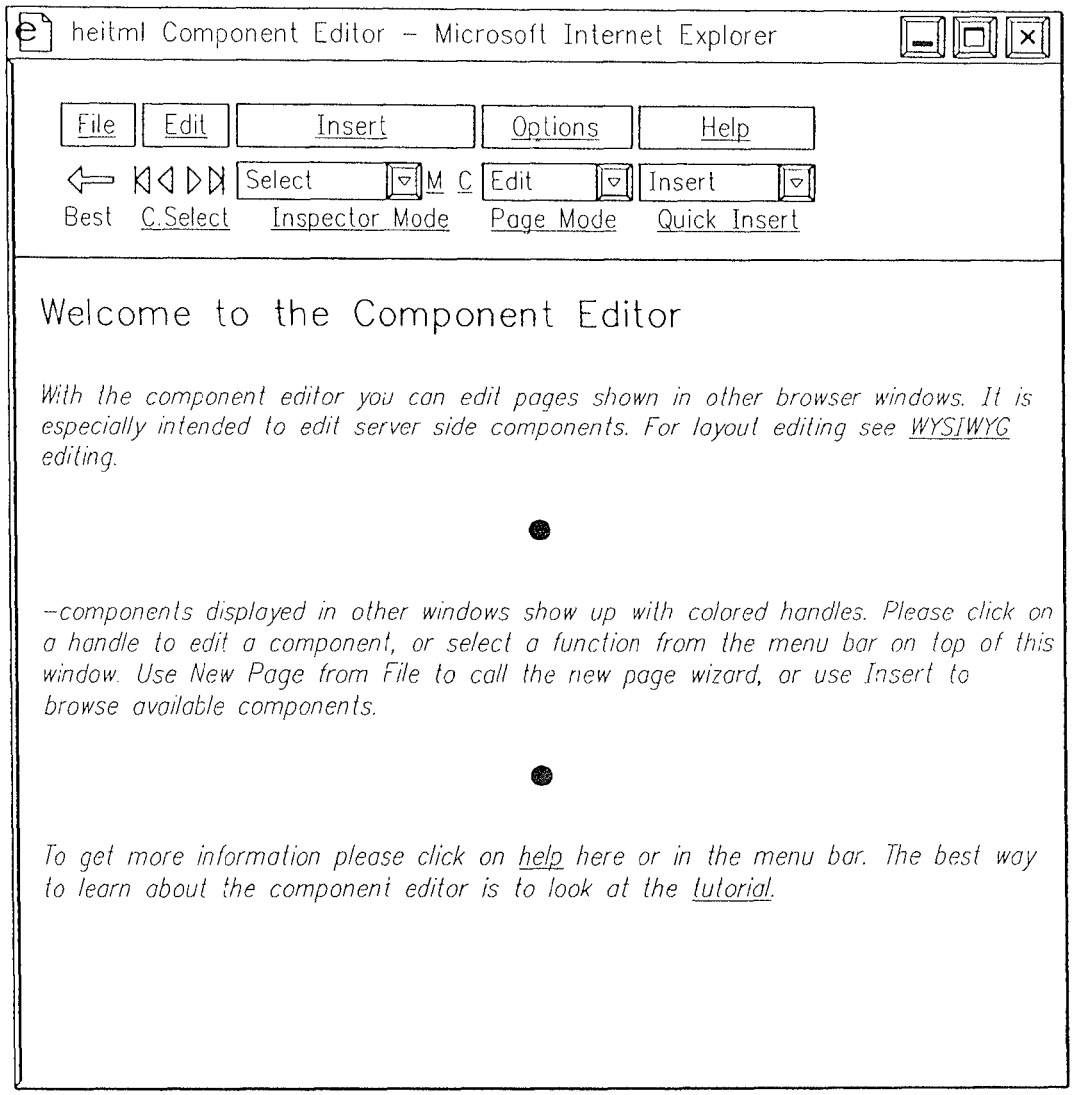
FIG. 3 is a screen shot illustrating the startup screen for the component editor.

Users can add, modify, or delete components on component pages using the component editor. The editor works through the internet inside the browser and is started by requesting a specific URL. This opens another browser window containing the editor menu and a work-frame containing an initial help text as shown in FIG. 3.

While the component editor window is open, pages are shown in edit-mode. In the edit mode, components are surrounded by handles as shown in FIG. 2. Handles have two important functions: to edit existing components and to mark the position where to insert a new component.

Clicking on a handle allows the user to edit a component. The component editor shows all attributes of the component in the component editor window inside an HTML form as shown in FIG. 4. The form has a save button to change the components' attributes and a delete button to delete the component. Although not shown in FIG. 4, where a component has an end tag, a Content button is provided to display the content of the component Clicking on a handle to display a component does not interact with the server (unless this is the first component of a certain kind). This is important because information on the components can so be browsed without server interaction, avoiding the possibly slow network. Clicking on the Content button, however, requires a server interaction.

Also, new components can be added to pages. By clicking on a certain menu item, the component catalog is displayed in the work-window. It is possible to browse the catalog and to select a suitable component (kind). This will cause an empty form to be displayed wherein possible attributes of the new component can be entered. Finally, clicking on a handle inserts the new component into the current page after the handle.

4. Detailed Description of the Component Editor

The component editor consists of three parts: (1) an extension of the ISSC processor called the component editor ISSC processor extension; (2) a collection of pages and scripts running on the client in the browser, the client part; (3) a program running on the server to perform the actual modifications on the pages, the server part. These parts are described in detail in Sections 5-7 below, however, prior to doing so some basic details will be introduced.

4a. Implementation Language

The implementation of a component editor is independent of the programming language used. However, the client part needs to be written in a language the client browser understands and that interacts well with the browser's page language. Below we give a detailed description on the client part and sometimes talk about javascript simply to give a more detailed description. This does not, however, mean that the principle algorithm is dependant on javascript.

4b. Component Instance Numbers (CINR)

Each component instance on a page receives a component instance number. This number is used in the client part to identify a particular component instance. Numbering starts from 1.

4c. Positions

A character position (charpos) exactly identifies a character inside a page. A charpos can be encoded in various ways, for example, as a byte offset inside the page or as a line and column number. We use line and column numbers. A page-name precisely identifies a page on the server. Usually this is a file name with a complete path, however, it can also be some other kind of identification, for example, if the pages are stored in a database.

The position of a component consists of the page-name, the charpos of the initial '<' and of the final '>' of the (begin) tag, and if there is an end tag the charpos of the initial '<' and of the final '>' of the end tag. The parser stores the position of each component in the component node of the AST. This is a simple extension to the parser.

We will refer to the page-name by pos.page-name, the charpos of the '<' of the begin tag by pos.beginleft, the charpos of the '>' of the begin tag by pos.beginright, the charpos of the '<' of the end tag by pos.endleft, and the charpos of the '>' of the end tag by pos.endright. In case of another syntax being used to mark components on pages, pos.beginleft and pos.beginright are the begin and end positions of the character sequence marking the begin of a component, while pos.endleft and pos.endright are the begin and end positions of the character sequence marking the end of a component.

Internally, positions are stored in records of the programming language of the ISSC-processor and the server part. However, positions are worked on in the client part also. Then they are converted into a text string representation since HTML forms can handle only text string fields but no records.

5. Component Editor ISSC Processor Extension

The extension consists of the Determining-Complevel procedure, to find out if we are in edit-mode, the Show-Handle procedure to display handles, and the Component-Information procedure to include information on component instances into the page.

5a. Component Editor Initialization

With reference to FIG. 19, the first task is to find out if a page needs to be displayed in edit-mode. The browser's Cookie feature is used for this purpose. While the component editor client part is activated, it sets a cookie name complevel to value 1. When the component editor is closed, the client part sets to cookie to 0.

If set, the browser sends the cookie with each request to the server. On initialization, the ISSC processor executes the Component Editor Initialization Procedure given in FIG. 19. It reads the cookie (step 171). If the cookie is 0 or not present, complevel is set to 0 (step 174).

Then the algorithm checks if the user is authorized for component editing. There are two ways to do authorization. IP based authorization checks to see if the client IP belongs to the group of allowed IP numbers (step 172). If so, complevel is set to 1 (step 175), otherwise cookie-based authorization is tried. People authorized for component editing get a certain cookie named 'secret' placed into their browser. Determine-Complevel checks to see if the cookie contains a valid key for component editing (step 173). If not, the user is not authorized to do component editing and complevel is set to 0 (step 174).

Note that this is really safe only if communication is encrypted. It is no problem, however, to use an encrypting web server for this purpose.

Note that the usual HTML authorization protocol can not be used since this requires everyone accessing the pages to enter a user name and a password. This is not desired for public accessible pages.

5b. Component-Information Procedure

With reference to FIG. 20, the component-information procedure is called by the ISSC processor upon creation of a new component instance before the display method of a component is called. If the page is displayed in edit-mode, the procedure inserts information on the current component instances into the page.

Finally, the information is stored in an array (named comps) of the browser's scripting language. It contains a component description for each component instance on the page. The component instance number (CINR) is used to index the array. Each component description is an object of the browser's scripting language and contains the following information: the kind of the component; the position of the component in the component page; and the attributes of the component. This is in turn is a record containing all the attributes given in the tag marking the component.

In order to create this data structure, a script must be embedded in the page. The script is executed by the browser when the page is displayed and it builds up the component array data structure.

The component information procedure first checks to see if the page is to be displayed in edit-mode by testing the complevel variable (step 181). If not set, nothing is done.

If this is the first time the component information procedure is called on a page (step 182), then the page initialization code is generated and a global component instance counter is initialized (step 183).

Then, the current component instance receives the value of the global component instance counter as its component instance number (CINR) and the global component instance counter is incremented. (step 184).

Afterwards, the procedure generates script code to build up a component description by creating the description object and assigning the component kind and the component instances position (step 185). This information is found in the component node of the parse tree. Code is then generated to store the attributes of the component instance into another object and to store it into the component description (step 186). Finally, code is generated to store the component description into the component array comps (step 187).

5c. Generate-Page-Initialization Code

The generated page needs to talk to the control window of the component editor. This communication must be initiated. For example, as shown in FIG. 22, in the case of a javascipt browser, a call to the open window function needs to be generated and the resulting handle needs to be stored (step 201). Then, the code for any helper functions needed in the page is generated. This basically means constructor functions for the component description, the component array and the attributes object. (step 202)

5d. Show-Handle Procedure

Handles are displayed by the show handle procedure illustrated in FIG. 21. This procedure has to be called inside the display method of a component. It depends on the layout of the component where handles can be placed best.

The show handle algorithm first checks to see if the page is to be displayed in edit-mode by testing the complevel variable (step 191) and if the current component instance stems from a component page. If so, it includes the handle in the browser code generated. In order to make the handle work, it must be enclosed in an HTML link that calls a specific procedure of the component editor client part in case the handle is clicked on. Therefore, an opening HTML <a . . . > tag is generated (step 192). The href attribute of this tags calls the cedit procedure of the component editor client part when the handle is clicked. The cedit procedure receives as a parameter the Component Instance Number (CINR) which is stored as an attribute of the current component instance and the handle kind (begin or end handle). Then, an <img . . . > tag to actually display the handle is generated in step 193. Finally the <a . . . > tag is closed (step 194).

6. The Component Editor Client Part

The component editor client part consists of a collection of HTML pages with embedded javascript programs.

6a. Description Technique and Drawings

We first describe the structure of the client part and then describe HTML page by page. Besides flow charts, we use drawings to visualize HTML pages and the tags and scripts placed on them. Each drawing representing a page is enclosed in a box with round corners.

6b. Structure

FIG. 23 shows the window and frame structure of the component editor. There is an application window (211) displaying the component pages. These pages are generated by the ISSC processor. They are displayed in edit-mode so that the components on the pages show up with handles attached. There can be several application windows or frames, in case the application itself works with multiple windows or frames.

Additionally, there is the component editor control window (212). It consists of two frames, the Menu-frame (213) and the working frame (214). The Menu-frame contains a fixed menu, while the content of the working frame changes depending on the function currently used.

Figure 24:
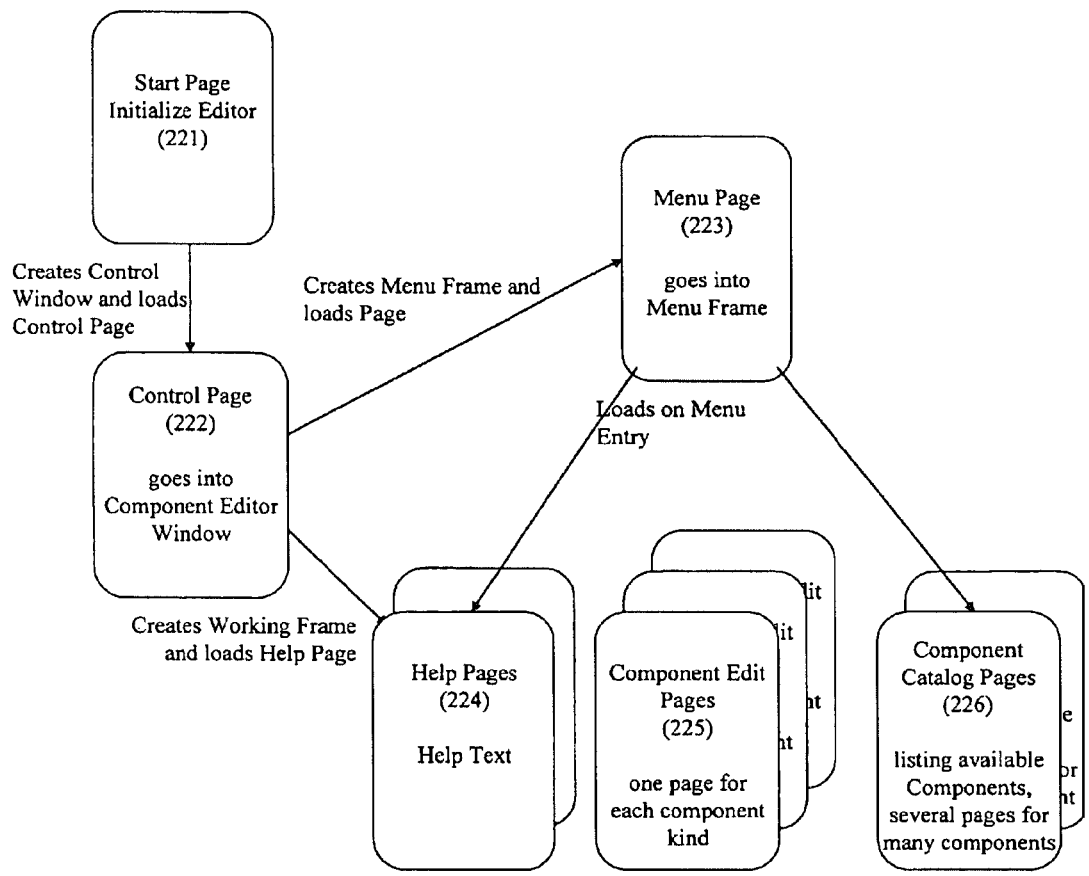
FIG. 24 is block diagram illustrating the component editor pages.

FIG. 24 shows the HTML pages for the component editor. Arrows indicate which pages reference other pages. The Start page (221) creates the control window and loads the control page (222) into it. The control page defines the frame set of the component editor and loads the Menu-page (223) into the Menu Frame and the Help page (224) into the Work-frame.

During normal operation of the component editor, clicking on a handle displays a component using a component edit page in the Work-frame. There is a component edit page for each component kind used.

Clicking on a menu item on the Menu-page can display various help pages or pages (226) of the component catalog. After selection of a component kind, a component edit page with an empty form is displayed.

Most of the internal script functions and global variables are defined on the control page. Since this page is never reloaded, all variables keep their values during a component editing session.

All pages shown in the structure can be kept in the browser cache, so displaying a page does not really access the server in most cases.

6c. Starting Page

Figure 25:
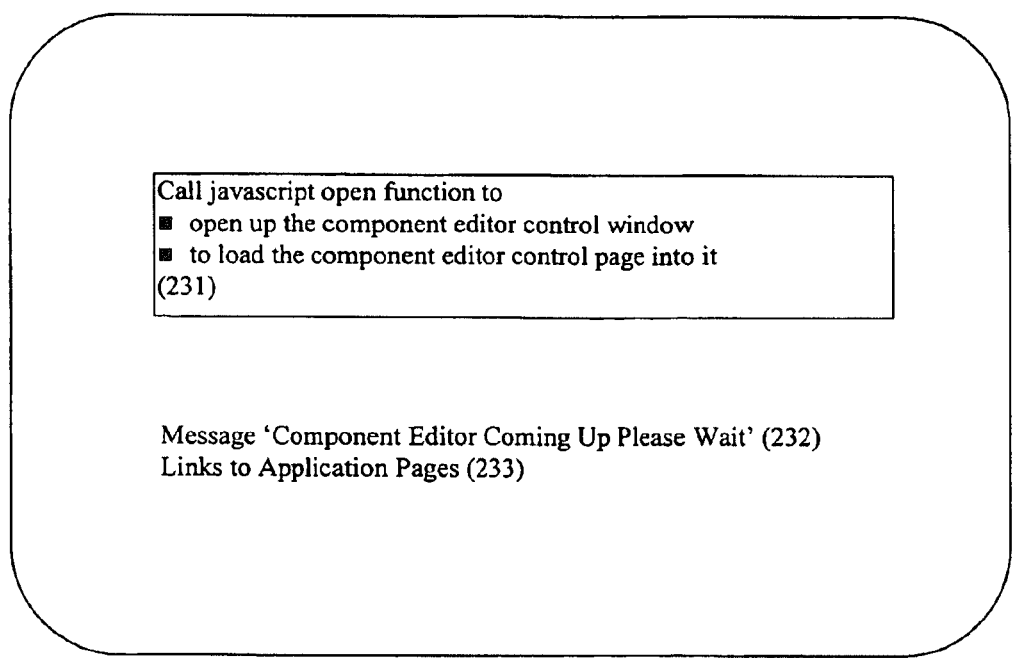
FIG. 25 is a schematic block diagram illustrating the start page of the component editor.

The starting page contains a simple script as shown in the flow chart of FIG. 25. Another browser window, the component editor window, is opened. By supplying the right parameters, the browser is told the right window size, to exclude any control bars, and to call the component editor control page into the new window (step 231).

The starting page contains text to indicate to the user that the component editor is being loaded now (step 232) and additional links (step 233) to show some application pages.

6d. Component Edit Page Interface

The component edit page is described below. However, since it is referenced before that, we will introduce the interface here.

There is a component edit page for each component kind. The page contains a form for the attribute values of a component. The page is used to enter a new component and to edit an existing one. There is a global variable name editcomp which contains the component description of the component instance that should be displayed on the form. So editcomp must be initialized the right way, before the component edit page is loaded.

The editcomp.text field is special (besides the fact that it is there only for component kinds that have an end tag). It is used to display the component's content. If there is no text field in editcomp, no text area shows up on the form and the content can not be edited. This is used to initially display a component since a component's attributes can be displayed without server interaction, but loading the content requires server interaction. The user can request that by clicking on the content button.

6e. Component Editor Control Page

Figure 26:
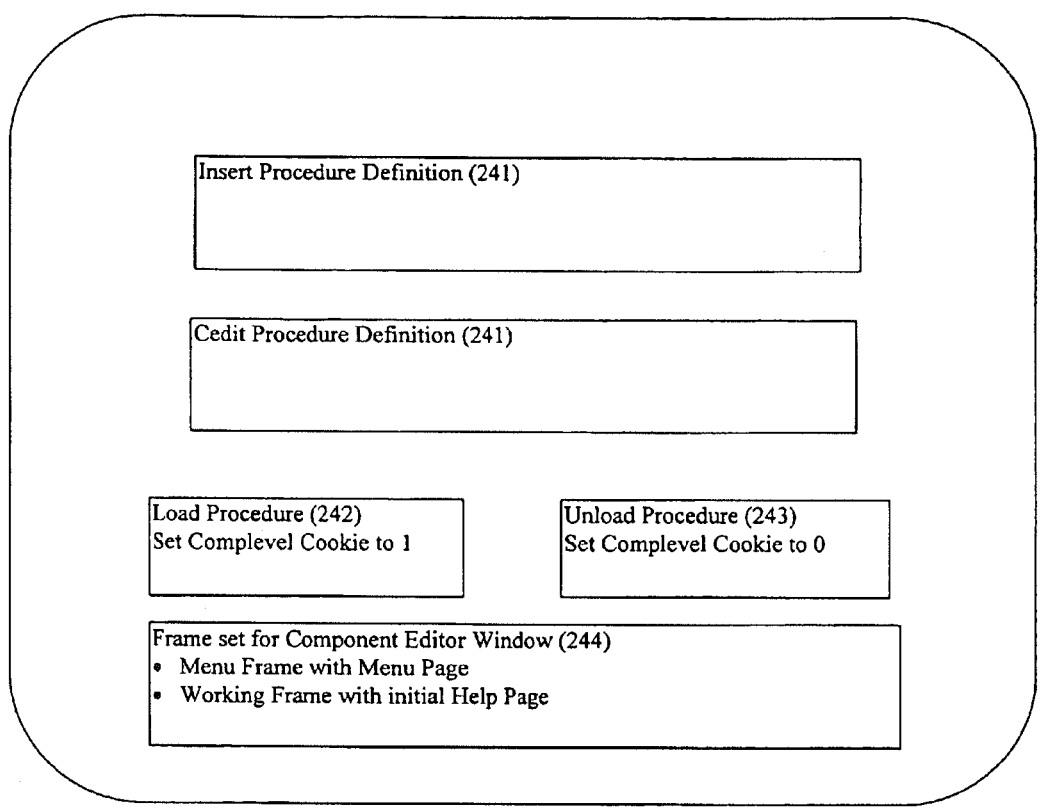
FIG. 26 is a block diagram illustrating the control page of the component editor.

As shown in FIG. 26, the component editor control page contains all the main algorithms of the client part, namely the cedit procedure and the insert procedure (step 241). The page also contains a load procedure (step 242) and an unload procedure (243) and a frame set (step 244) defining the Menu- and the Work-frame. The Menu-frame is defined to contain the Menu-page and the Work-frame to contain an initial help page.

The load procedure (step 242) is called by the browser when the control page is completely loaded. The procedure sets the complevel cookie to 1. The unload procedure (243) is called by the browser when the control page is unloaded, i.e., the component editor window is closed. The procedure sets the complevel cookie to 0. This way, the complevel cookie indicates if the component editor window is open. This information is used by the ISSC processor to find out whether to display a page in edit-mode or not.

6f. Menu-Page

The page layout looks like a menu bar. It contains links to request various functionality of the component editor; links to help pages; and links to component catalog pages. All links in the menu page use either the HTML target parameter to make the linked pages appear in the Work-frame, or they use the 'javascript' syntax in order to call a javascript procedure in the control page. The menu page is an ideal place to add functionality to the editor simply by adding links.

6g. Catalog Pages

The catalog pages contain a catalog of available components (or more precisely component kinds). The user can browse the catalog, read the descriptions and finally click on a particular component kind. This will select the component kind for insert. Technically, all links to a certain component kind use the 'javascript:' URL syntax to evoke the Insert procedure and to pass the component kind in form of a string.

6h. Insert Procedure

Figure 27:
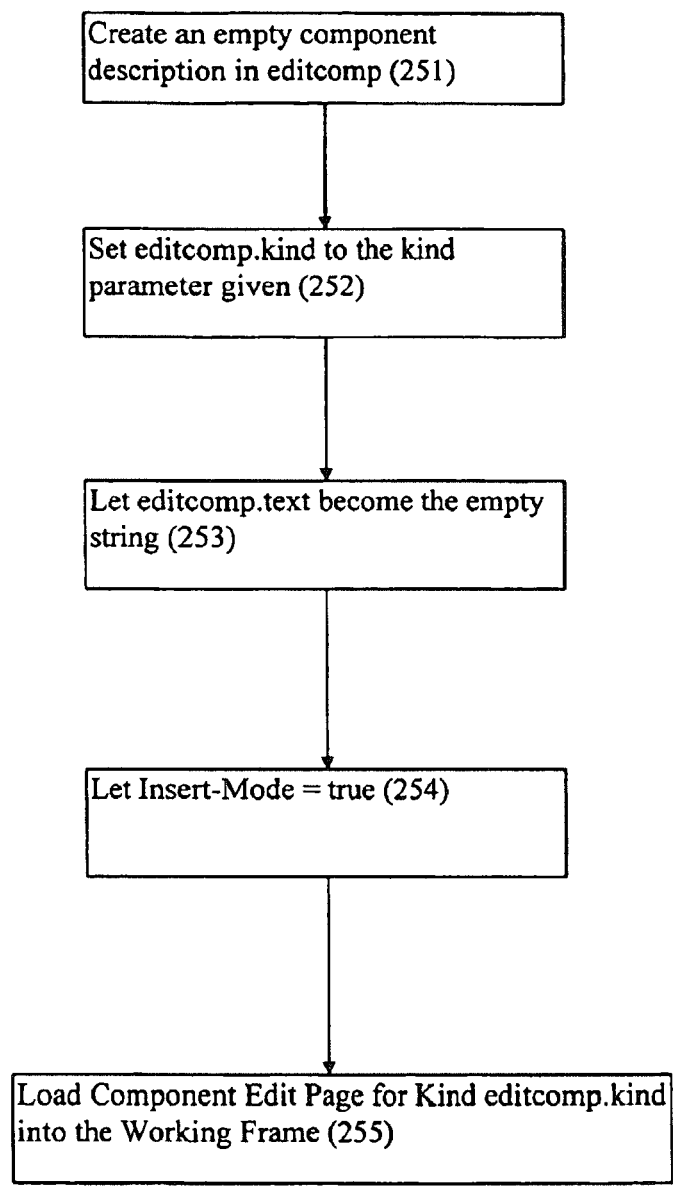
FIG. 27 is a flow chart illustrating the algorithm for the insert procedure.

The Insert procedure is shown in FIG. 27. An empty component description is created in the editcomp variable (step 251) possibly containing default values. The kind field of editcomp is set to the selected component kind (step 252). The text field of editcomp is set to an empty string (step 253) or a default value in order to make the component edit page display an empty text field for the content of the component (in case the component can have a content). Then, the Insert-Mode flag is set so that clicking on a handle will insert the new object (step 254). Finally, the component edit page for the selected component kind is displayed (step 255).

6i. Cedit Procedure

The cedit procedure is contained in the client part, more precisely, on the Control page. It is called when the user clicks on a handle. Cedit receives the component instance number, the window the component instance is displayed in, and the handle kind (begin or end handle).

Figure 28:
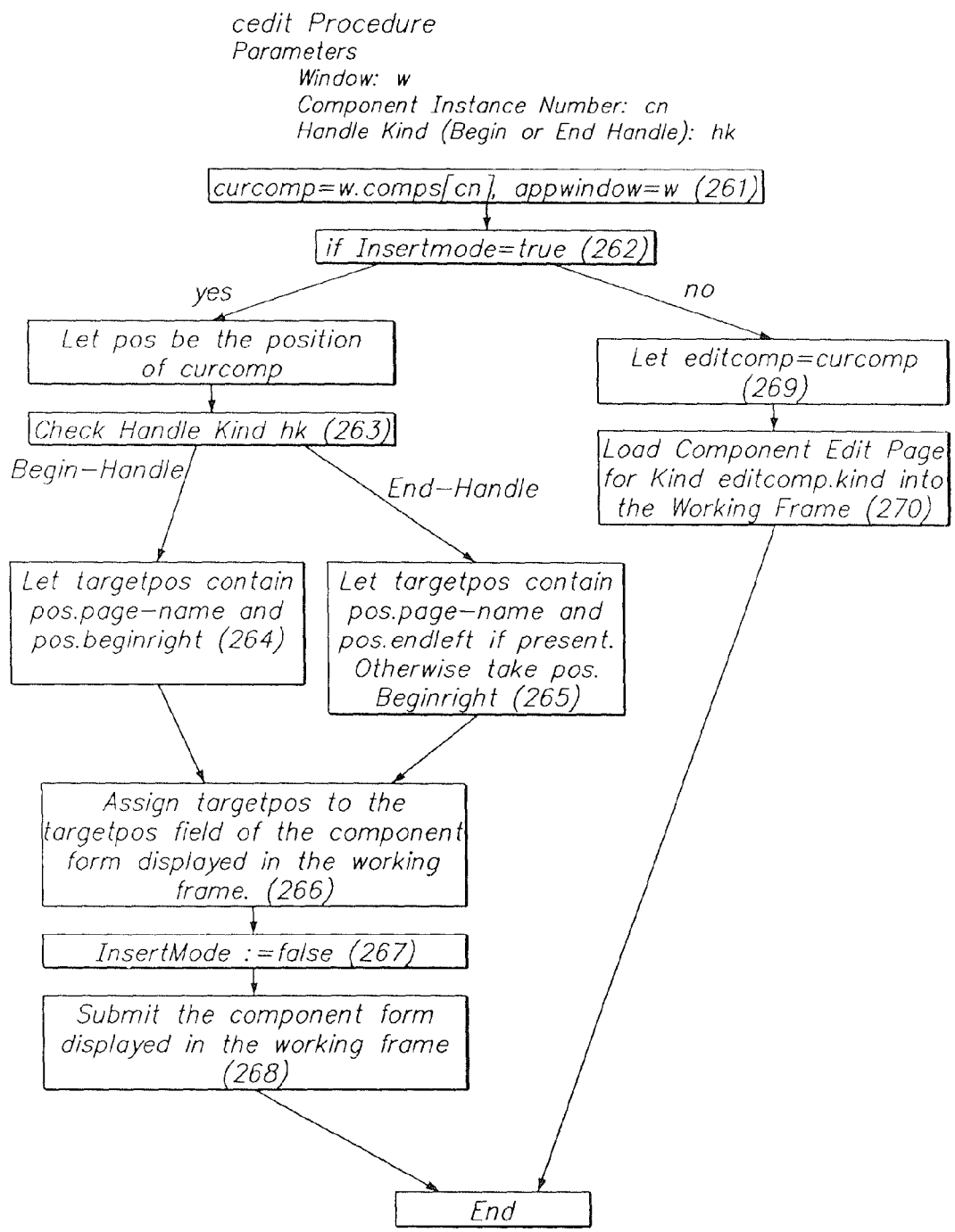
FIG. 28 is a flow chart illustrating the algorithm for the cedit procedure.

As shown in FIG. 28, the first step is to get the component description (step 261). Using the window handle passed, the comps array of the Application-window can be accessed. By indexing comps with the component instance number, we get the component description. The component description is stored in the curcomp variable for later access. Also, the window handle of the application window is stored in the appwindow variable. This is used to issue a reload in the application window after an update.

It is checked to see if we are in insert mode (step 262). By clicking on the handle in the insert-mode the user requests to insert a new component after the handle. A filled out component form is already waiting in the Work-frame at this time. The target position "targetpos," i.e., the position where to insert the new component, is calculated. It consists of the page-name and the charpos. If the begin handle (step 263) is clicked, the target position is after the begin tag of the component (step 264). Otherwise, if the user clicked on the end handle the target position is after the end tag unless we have a component without end tag (step 265). Then, the target position is after the tag regardless of which handle is clicked. Then, the targetpos is inserted into the targetpos field of the component form in the Work-frame (step 266), the Insert-Mode is reset (step 267), and the form is submitted (step 268).

In case there is no Insert-Mode, clicking on the handle displays the component in the Work-frame. This is done by storing the component description into editcomp, the component description of the currently edited component (step 269). Afterwards, the component edit page for the current component kind is loaded into the Work-frame (step 270).

6j. Component Editing Pages

Figure 29:
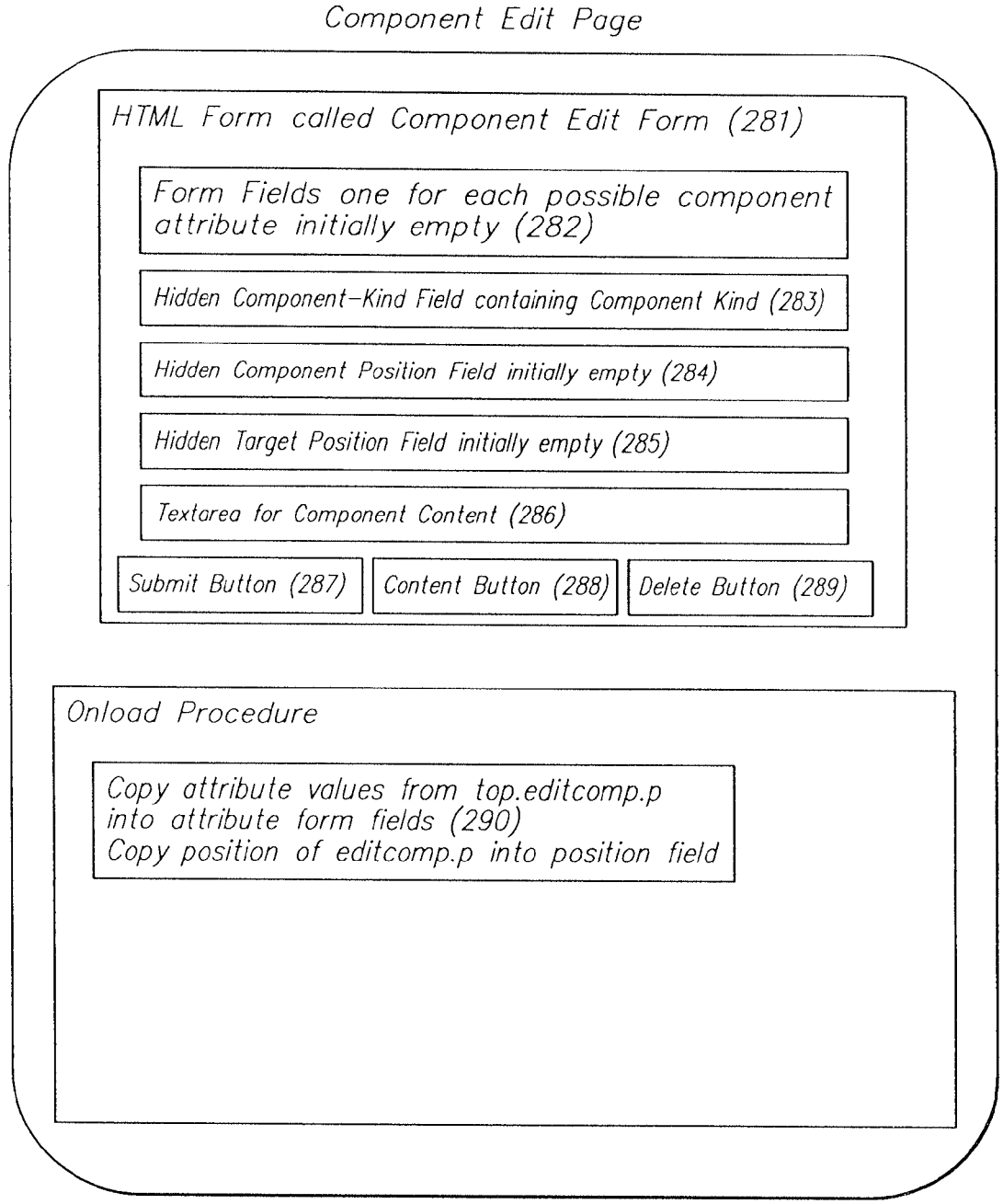
FIG. 29 is a schematic block diagram illustrating the component edit page.

For each component kind there is a component editing page as shown in FIG. 29. It contains an HTML form (281) designed to edit components of a specific component kind and possibly help information about the component kind.

The form contains fields (282) for each possible component attribute. It contains a hidden field (283) containing the component kind, a hidden field (284) for the component position, and a hidden field (285) for the target position in case of an insert.

For components that have content and an end tag, an HTML text area field (286) is on the form named text. Using a script, we make sure that the text area is shown only if editcomp indeed has a text field. see 6k below.

Additionally, the form contains a submit button (287), a content button (in case of a component kind with end tag) (288), and a delete button (289). Using a script, the buttons are hidden in case of a new component (editcomp.pos not defined) see 6k below.

The component edit page contains an onload procedure. It reads the information of editcomp and displays it in the form (290). This is the position of the component and its attributes. Note that fields not present in the component description editcomp are left empty in the component form.

6k. Hiding Parts of Pages Based on a Script

It is not totally straight forward in current javascript based browsers to exclude part of the page, based on a javascript condition. What needs to be done is to not include the conditional part in the HTML code. Instead an embedded script is used that inserts the conditional part into the page using write statements, provided the condition is met.

7. The Component Editor Server Part

The server part is called by the web server when a component editing form is submitted. It then performs the action requested by the user, which is either to modify a component page by inserting, deleting, or updating a component, or to get information from a component page and to display another form for the user.

Technically, the server part is as a page generation program that is connected to the web server as shown in FIG. 6. The program generates a web page that is sent to the browser as described and shown in the Work-frame of the component editor. In addition, the server part performs the requested changes on the component pages.

7a. Functions Performed

The server part can perform various functions based on the form data supplied: insert a Component described by the form into a Page; delete a Component with or without end tag from a Page; update a Component based on the form data with or without changing the content of a tag with end tag; display a Component Form with a text area to edit the content of a specific component 7b. Form Fields Sent In case of an insert, the form data set contains a field named 'targetpos', which contains the page-name and charpos where the new component is to be inserted.

In case of a delete, the form data set contains a button named 'delete'.

In case of an update, the form data set contains a button named 'submit'.

In order to display the content, the form data set contains a button named 'content'.

For insert and update, the form data set contains a field name 'kind' containing the component kind and fields named 'p.' attributename that define component attributes. In addition, there may be a field named 'text' containing the content of a component with end tag.

For delete, update and display content there is also a 'pos' form field that contains the position of the component encoded into a string. The position contains the page-name of the component page, beginleft, beginright, and possibly endleft and endright.

7c. Component Editor Server Part Algorithm

Figure 30:
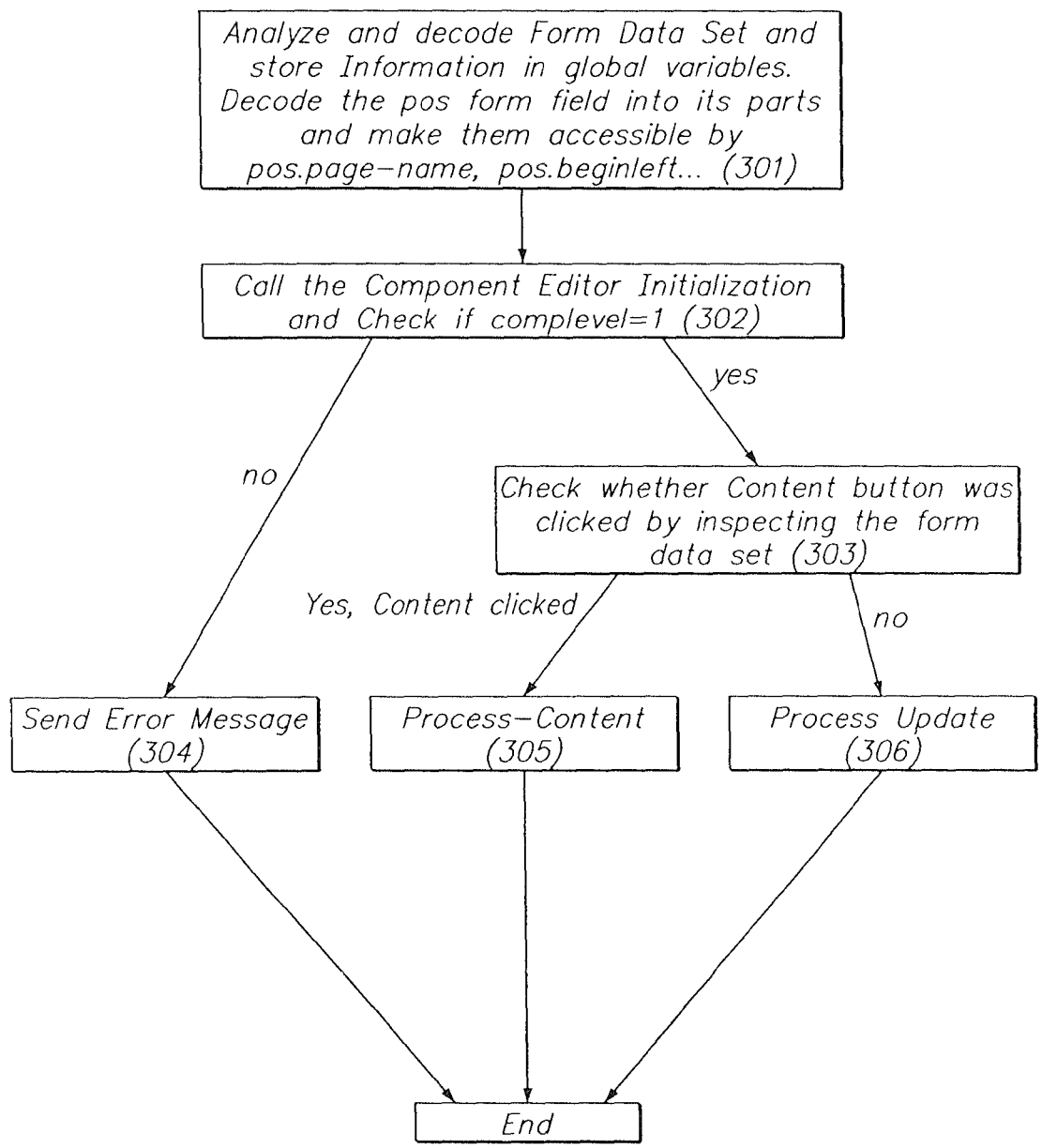
FIG. 30 is a flow chart illustrating the algorithm for the component editor server part.

A flow chart is given in FIG. 30. First, the form data set submitted is decoded and all form fields sent are stored in an easy accessible form (step 301). Then, we check to see if the user is authorized to perform the desired modification (step 302). If not, a page containing an error message is generated (step 304). If the user is authorized, we check to see if the content button was pressed by inspecting the form data set (step 303). If so, the process-content routine is called (step 305); otherwise the process update procedure (step 306) is called.

7d. Process-Content Procedure

Figure 31:
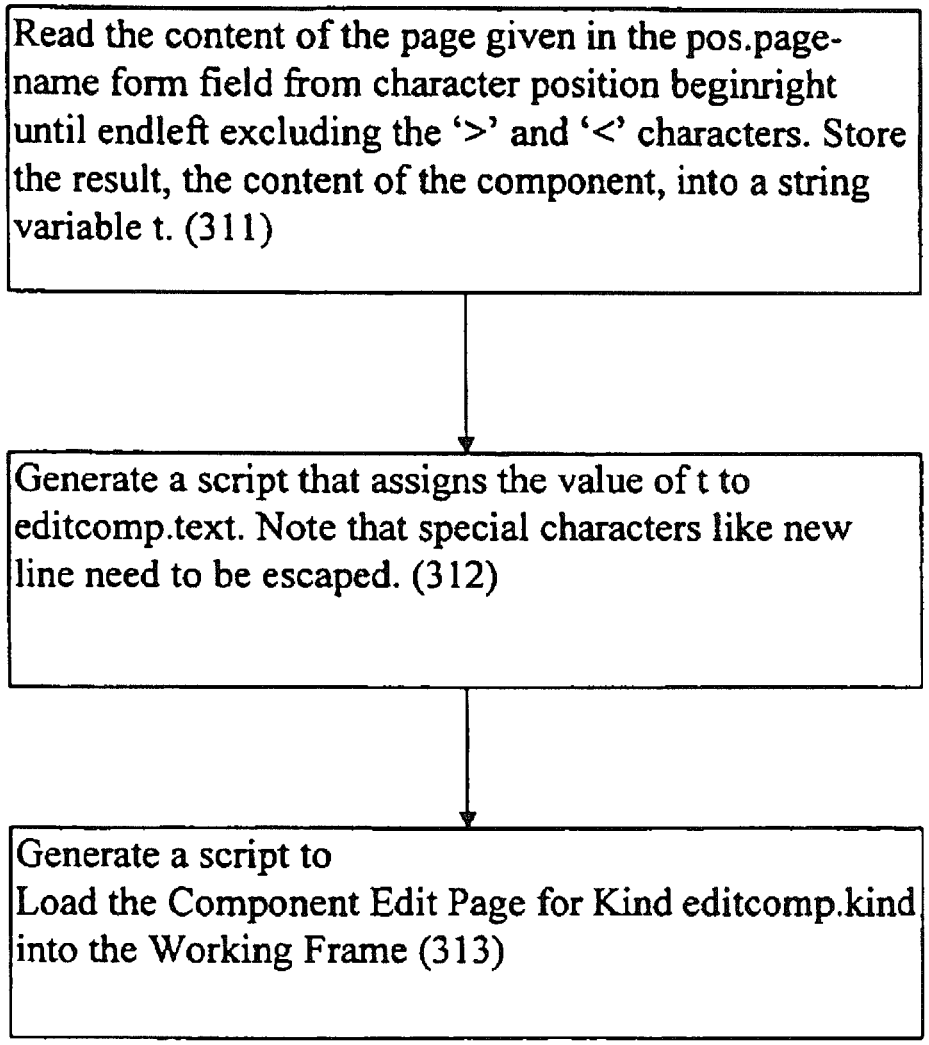
FIG. 31 is a flow chart illustrating the algorithm for handling the content button.

A flow chart is given in FIG. 31. Based on the position form field, we can access the content of the component. More precisely, the position gives the file name, the position of the '>' of the begin tag and the position of the '<' of the end tag. All characters in between form the content of the component. By reading the file and extracting all the characters between these positions, the algorithm loads the content into a string variable t (step 311).

Since the algorithm generates an HTML page that is loaded into the Work-frame, it is possible to embed javascript code in that page. The algorithm does that and generates javascript code that assigns t to editcomp.text (step 312). Basically, the code can look like 'top.editcomp.text="t"' where t is inserted literally. However, special characters in t like new lines, carriage returns and double-quotes need to be escaped.

Finally, javascript code is inserted that loads the component edit page of the appropriate kind into the Work-frame (step 313). This means that the page generated will actually not show up because the component-edit-page is loaded immediately afterwards.

7e. Process-Update Procedure

Figure 32:
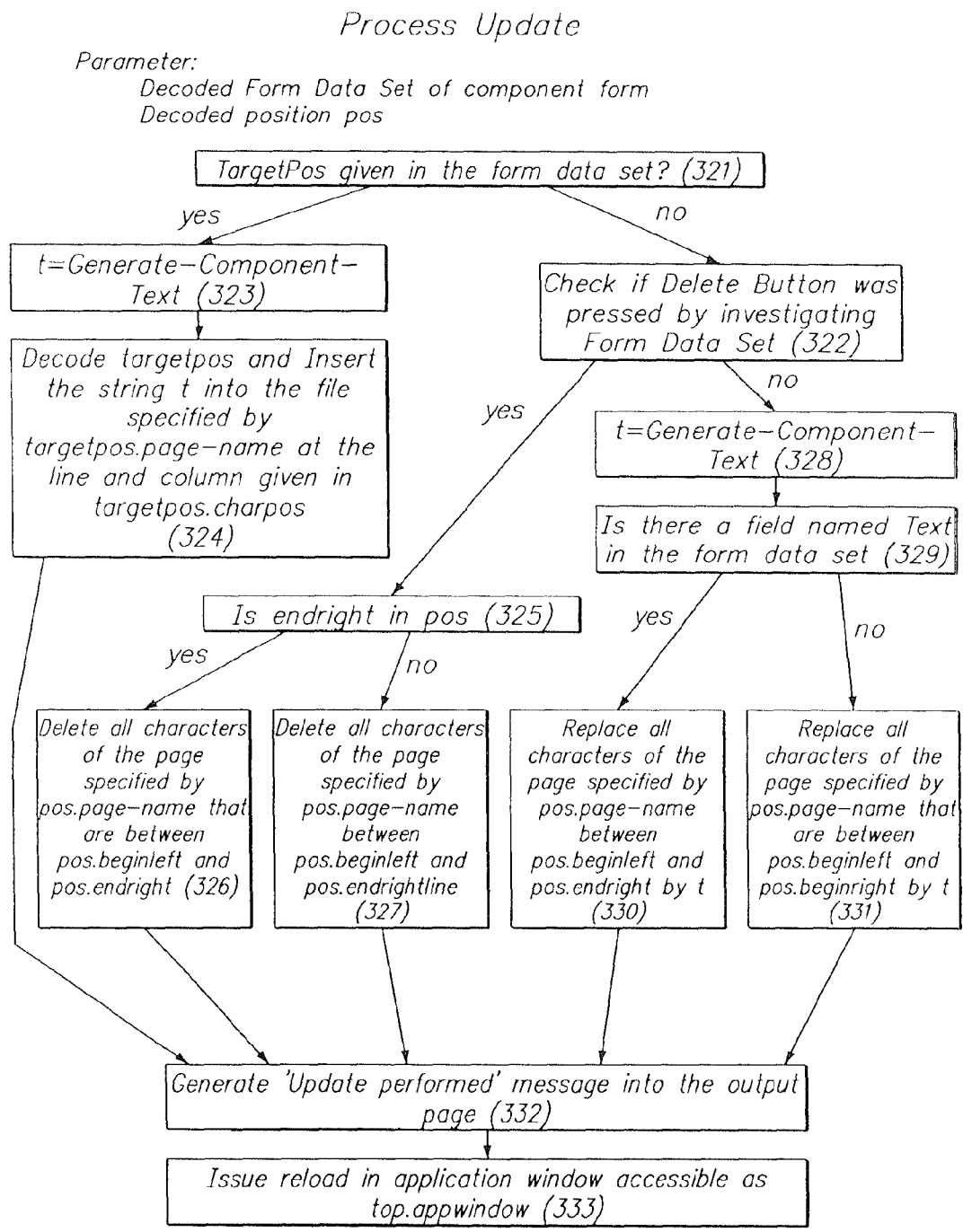
FIG. 32 is a flow chart illustrating the algorithm for updating a page.

A flow chart is given in FIG. 32. The algorithm first decides (in step 321) what kind of update to perform. If the form data set contains a target position, it is an insert (handled in step 323). Otherwise, if (step 322) the form data set contains a Delete button then a delete is requested (handled in step 325). Otherwise an existing component is to be saved (step 328).

For an insert, Generate-Component-Text is called generating the text to be inserted (step 323). Then, this text is inserted at the location specified by the targetpos form data field (step 324). Targetpos contains the page-name as well as the character position. The component editor reads, modifies and writes the page accordingly.

For a delete, there two cases: a component with or without end tag. If the position form field contains the character position of the end tag, then all characters of the page specified by page-name are deleted starting from the position of the left '<' of the begin tag (beginleft) until the position of the '>' of the end tag (endright) (step 326). Otherwise, all characters of the page are deleted starting from the position of the left '<' of the (begin) tag (beginleft) until the position of the '>' of the (begin) tag (beginright) (step 327).

To save a component Generate-Component-Text is called to produce the new text (step 328). Then, there are also two cases to distinguish, either the begin tag is updated or the complete element consisting of begin tag, content, and end tag. The first case can happen if the component does not use an end tag or if the user wants to modify the attributes but not the content of a component with end tag. If there is a 'text' field in the form data set (step 329), then all characters in the page specified page-name that are between beginleft and endright are replaced by t (step 330). Otherwise, only the characters between beginleft and beginright are replaced (331).

Finally, an update performed message is shown on the page (step 332) and some javascript code is inserted to cause a reload of the Application-window in the following way (step 333): Since the page generated is loaded into the Work-frame using 'top.appwindow' the appwindow variable of the control window can be accessed. The variable 'appwindow' is controlled by the client code to make sure it contains the handle of the application window so that the reload method of 'top.appwindow' must be called.

7f. Generate Component Text

This procedure generates the text for a component to be inserted or to replace another component. The procedure reads the form data set and results in a string (possibly with new line characters).

A flow chart is given in FIG. 33. First, a '<' is generated followed by the content of the kind form field (step 341). Then, the algorithm loops for all form fields whose name starts with 'p.' (step 342). For each form field named p.attribute-name, the text attribute-name'="'attribute-value"" is appended where attribute-value is the value of the p.attribute-name form field (step 343). After all attributes, a closing '>' is generated (step 344).

If the form data set contains a field named 'text' (step 345), then the content of the text form field is also generated (step 346) followed by an end tag '</' kind '>' (step 347) where kind is the content of the kind form field.

Note that it is straight forward to adapt this procedure to generate any other syntax used to mark components.

D. heitml Language

This section describes object oriented features of heitml and their application: interactive server side objects. An interactive server side object can be placed on a dynamic web page by a single HTML/XML element so even non-programmers can deploy them. Typical interactive objects are database query forms, scrollers, database entry forms, shopping baskets, etc.

heitml extends HTML by object oriented programming concepts, so that interactive objects can be programmed. An interactive object can, besides performing complex functions to display itself, also remain active longer than a single page request in order to process user input in the next dialog step.

heitml is a language extension of HTML. HTML describes static hypertext documents. heitml extends this to server side dynamic documents and complete web applications as needed for web-database integration or e-commerce applications. HTML pages are usually downloaded verbatim from a web server and displayed by a browser. heitml documents on the other hand are processed by the server and transformed into HTML before being sent to the browser.

heitml introduces server side interactive objects. An interactive object within a web page displays dynamically generated information, waits for user input, and processes it. Interactive objects are placed on web pages using the well known tag syntax of HTML, XML, and SGML. This allows non-programmers to use server side objects on their pages and thereby drastically improve cooperation in project teams consisting of programmers, graphic designers etc.

The biggest advantage of heitml is that interactive objects can be combined, nested, parameterized, and programmed very flexibly. These features are crucial to create applications by reusing cooperating interactive objects instead of rewriting everything from scratch each time.

There are class libraries of ready-to-use heitml objects. All are implemented using the programming language features of heitml. Library objects can be freely combined with user written objects. Also new objects can be created by inheriting from the already existing classes.

Classically, web applications are programmed in a page oriented way. This means programs or page templates with embedded programs are created by the programmer. Each program or template is started when the browser requests a page. Then this single HTML page is generated and sent to the browser.

Adding some server side functionality, for example a database form, requires additions in at least two places: The form needs to be added to the page program that shows the form and a processing routine needs to be added to the following page program. This hampers the creation and especially the use of reusable components: A user who just wants to add some server side functionality must insert the right calls in several places of the program and so requires detailed knowledge of the program and the component.

The goal of heitml is to specify the use of server side functionality the same way as browser functionality, namely, by using HTML/XML like tags, so that it can be used by an HTML-designer without programming knowledge. We have shown that this is possible and are convinced that there is no need for using another totally different syntax/semantics, as many other approaches do. In contrast, we think that for the programming of server side functions syntactical features beyond XML are necessary.

For example, a counter can be used on a heitml page by writing:

The counter value is <counter name="test"> or for a counter with a reset button:

This is a <counter name="test" resetbutton>

Note that there is no big difference in the description, although there is a big difference in the implementation: The counter with reset button reacts on a users response (i.e. pressing the reset button).

Another example is a database display element and a database scroller element:

```
This is the database content:
<dbdisplay relation="customers">
    <dbformat>
        <dbfield "Name"> <dbfield "Address"> <br>
    </dbformat>
    <dbonempty>
        No data found.
    </dbonempty>
</dbdisplay>
```

This displays a list of customer records on the web page. The <dbformat> element holds the format of a database record, and the <dbonempty> contains the text to be displayed in case the database is empty.

If the tag <dbscroller> is used instead of dbdisplay, not all records are shown at once, but scroll buttons make it possible to scroll through pages of data. Clearly the implementation of a scroller is much more complex, since it must react to the scroll buttons accordingly.

There are many possible new elements like <counter> or <dbdisplay>. Examples are a <dbform> to modify database records or, more application-specific, a shopping basket or a discussion group.

It is very important, however, that tags can be freely combined. Only combination makes it possible to build complex applications. Have a look at the following example:

```
<dbdisplay relation="customers">
    ...
    <dbonempty>
```

```
          No data found <counter name="nodata" resetbutton>
      </dbonempty>
</dbdisplay>
```

The counter now only counts if the database is empty, because it only shows up on the page if the database is empty. This means server side features of a page change dynamically for example based on database content.

It is even more interesting to enter the counter into the <dbformat>. In this case every database record shown is counted and there are counter appears several times on a single page. These things may sound simple and straight forward, but they require certain special implementation techniques.

Just as an HTML web site consists of HTML pages, a heitml web site consists of heitml pages. heitml is an extension of HTML, so heitml pages can contain normal HTML code. In addition, heitml pages contain server side functionality in the form of objects. A heitml tag such as <counter> actually places a counter object on the page.

When a heitml page is requested from the server, the heitml objects on this page are created in the server. The objects then perform their specific functions, possibly interacting with other objects, and finally generate HTML code to display themselves in the browser. When the user answers, e.g. by clicking on a button or a link of an object, the object waiting on the server receives a message and reacts accordingly.

A heitml object that specifically waits for user responses is called interactive. For example a usual page counter is not interactive, yet a counter with a reset button is interactive, since the object must wait on the server for the user to press the reset button.

Another example of a non-interactive object is <dbdisplay>. It performs a database query and shows the results on the page. <dbscroller> does the same but allows the user to scroll. Since the <dbscroller> reacts on the scroll buttons it is interactive.

As usual in object oriented systems, you can define classes in heitml. A class defines the functionality of a certain class of objects. Once a class such as counter is defined, objects of that class can be placed on pages by using the tag syntax.

heitml offers the possibility to define classes using the <clef> tag.

Example: <def mytag><inherit Object> This is to be printed</def>

This defines subsequent uses of <mytag> to be replaced by "This is to be printed". More precisely it defines a class named mytag so that objects of the class show up as "This is to be printed". So when the tag <mytag> occurs on a page an object of the class mytag is created and displayed as "This is to be printed".

Below we give the syntax of a tag definition in EBNF. Terminal tokens are printed in bold letters. Nonterminals are written in italics. The nonterminal heitml stands for any heitml text, Ident stands for an identifier enclosed in quotation marks.

Syntax: <def Ident><inherit Ident>heitml</def>

Using this mechanism, text, parts of pages and page layouts, can be packed into objects and be reused several times. To reuse a class on several pages, heitml provides an inclusion mechanism. Definitions can be written into include files which can be reused by other pages.

Classes can have parameters and parameters might have default values. Default values are taken, if a parameter is not given, when a tag is used. Parameter values can be inserted into the text using the <?> tag:

```
Example: <def big text><inherit Object><font size="+4"><? text></font>
            </def><big text="heitml"> prints heitml
         Syntax: <def Ident Parameterlist > <inherit
         Ident > heitml </def>
            Parameterlist ::= ( Identifier [ = string ] )*
```

Definitions can be nested, i.e., there can be a tag definition inside another one. Nested definitions are called methods of the enclosing class and may not contain an <inherit> Tag. An inner definition is visible only within the enclosing define. In fact, the inherit tag can also be left out in non-nested definitions. In this case they define methods of an implicitly defined class named page. Practically, they are often used like procedures of other languages.

Inheritance is the major object oriented concept used for achieving reusability. Through inheritance it is possible to create several similar objects without specifying each one from scratch. Classes can inherit the methods of another class. The <inherit> tag is used for this purpose.

Syntax: <inherit Class>

It must be placed directly behind the <def> tag and the class must give the name of a preceding class definition. It is then called a superclass. What inheritance means is that all the methods of the superclass become visible, unless they are overwritten by a new method definition.

We call an element that consists of a start-tag, the content, and an end-tag an environment. Environments are defined using the <defenv> tag. They can be classes when defined with <inherit> and methods otherwise.

```
Syntax: <defenv Ident Parameterlist > [ <inherit Ident > ]heitml </defenv>
        Parameterlist ::= ( Identifier [ = string ] )*
```

The heitml text between <defenv> and </defenv> is called body and may contain the <defbody> tag. When the environment is used on a web page, the whole environment is replaced by the body. Inside the body the <defbody> tag is replaced by the content.

Inheritance works for environment definitions the same way as for normal classes.

Additionally, inside the content of an environment methods of the environment-class can be used.

```
<defenv gl>
      <def li></tr><tr><td><img src="mybullet.gif"></td><td></def>
      <table><tr><td></td><td><defbody></td></tr>
      </table>
</defenv>
<gl>
<li> Topic 1
<li> Topic 2
</gl>
```

The <gl>-tag defines a list, like <ul> but uses a gif-image as bullet. As usual, the <li> tag can be used to create list entries inside the <gl>-tag.

Executing the <gl> creates a table. The first column contains the bullet and the second column the text. The <li>-tag is redefined to achieve this functionality. A <li> tag can occur several times in a document, sometimes within an <ul> or <ol> and sometimes within a <gl>. The redefinition of <li> as a method of <gl> ensures that <li> is redefined within a <gl> only. This heitml language feature is very powerful, because different tag definitions can be used in each environment.

An interactive object stays on the server waiting to process user input. For example, database forms or database scrollers are interactive objects. They are initially displayed on the page and they contain links or buttons the user can click to request a certain function. This needs to be programmed in form of a program procedure that we call processing routine. We need to introduce more programming concepts before we can give more details on interactive objects.

heitml is an extension of HTML and a complete object oriented programming language. This means that not only adaptive web pages, but complete applications can be done. Therefore, it is a hybrid language combining document description and programming in one language.

heitml features three important syntax changes that apply to heitml tags:
(1) heitml allows expressions in parameter positions: e.g. <mytag param=5*6+26>. Parameter expressions are evaluated and the result is used. To pass a constant, quotes must be used e.g. <mytag param="test">.
(2) heitml knows positional parameters. HTML uses keyword parameters, i.e. the parameters of a tag can be given in any order but are always written in the form parametername=value. In contrast, most programming languages have positional parameters, so heitml supports both. The parametername can be left out if the parameters are given in the same order as in the definition.
(3) Programs using a lot of tags soon become unreadable, because of many ><sequences. So heitml allows to replace >< as a semicolon and to leave out "let" after a semicolon.

Example: <let i=1><while i<100><let array[i]=i*i><let i=i+1></while>
New Syntax: <let i=1; while i<100; array[i]=i*i; i=i+1; /while>

A heitml page is seen as a program and is processed in textual order. Ordinary text is just displayed and HTML tags work as usual (when the output or heitml is sent to a browser).

heitml introduces a variety of new tags directly corresponding to common language constructs. There are control structures, e.g.

Syntax: <if Expr > heitml <else> heitml </if>
<while Expr > heitml </while>
<break> and expression handling tags to evaluate a variable, to insert the content of a variable into the document, and to assign some generated text to a variable.

Syntax: <let Variable = Expr >
<? Expr [ Format ] >
<assign Variable > heitml </assign>

In addition, expressions can be used as parameters for user defined tags. Finally, there are tags for accessing the database using SQL.

heitml variables are dynamically typed. Possible types are boolean, integer, real (double precision), string, and object. There are the usual operators and a lot of built in functions.

Variables do not need to be declared. They are always local to the current page or the current definition. In addition, there are global variables that always have to be written as gl.variablename, and session variables written as se.variablename. Session variables keep their values between page accesses.

The object data type is most interesting in heitml since it provides the full functionality of associative arrays. It covers the record/struct/object datatype as well as the array datatype of other languages.

An object consists of several fields. Each field can contain a value of any type. The fields are ordered and numbered starting with 0. Each field can have a field name, which must be unique. If o is an object, then o.name accesses the field with the given name. o[i], where i is an expression leading to an integer, accesses the i-th field. o[s], where s is an expression leading to a string, accesses the field with the name given by s. Associative arrays are a powerful concept since they allow addressing of subobjects in a very flexible way.

Objects are fully dynamic, so fields can be added and deleted etc. Multidimensional arrays or arrays of objects can be realized by using objects as field values. Objects use reference semantics, as is common in object oriented languages.

Each object belongs to a class that is determined to create the object. An object is created either by directly calling a constructor function (named as the class name), or by using the class name as a tag. Object methods can be called using the usual syntax x.methodname (parameters), where x is an expression evaluating to an object.

The body of a class definition implicitly defines a display/create method. When the class is called (i.e. a tag with the name of the class is processed) an object of the class is created and the display/create method is executed.

Inside each method, the object can be referred to by the keyword this, so object fields can be accessed writing this.fieldname. The following example clarifies this. <al> works as <gl> from 3.5 but marks the list items with letters. <al> uses an object variable to keep track of the letter to be taken next.

defenv al>
    <def li></tr><tr><td><? chr(this.char); this.char=this.char+1>)</td><td>
    </def>
    <let this.char=asc("a")>
    <table><tr><td></td><td><defbody></td></tr>
    </table>
</defenv>

The object vanishes unless this is assigned to a global data structure. It is possible to assign the object to a session variable and to later call a method of the object using the programming language method call. This is the way interactive objects work.

The prototype of an interactive object is a database form that displays a database record and allows the user to update it. Such a form could look like <dbform ... >
...
<fieldtext "Name">

-continued

```
       <fieldtext "Email">
          ...
       </dbform>
```

The form consists of the <dbform> environment with some parameters identifying the record to be shown. The content describes the layout of the form; <fieldtext> displays a field of the database record.

Simplified implementations of <dbform> and <fieldtext> are given below. No error checks are performed and the database record must always exist. <dbform> inherits the method registerme from the class Interactive. Registerme saves the object in a session variable and makes sure that the process method of the object is called when the user clicks the submit button of the form.

```
<defenv dbform rel key;
     inherit Interactive;
     def process inp;
          dbupdate>
               update <? this.rel> set <? inp ",%Qn"> where
               <? this.key "AND%Qn">
               <
          /dbupdate;
     /def
     def fieldtext name size;
          ><input name="<? this.bid>.<?name>" size=<?size>
          value=this.record[name]><
     /def
     sesform;
          this.rel=rel; this.key=key;
          dbquery q> select * from <? rel> where <? key
          "AND%Qn"> <
          dbrow;   this.record = q; /dbquery;
          registerme;
          defbody
          > <input name="<? this.bid>Submit" type="Submit"
          value="Submit"> <
     /sesform;
/defenv>
```

The class <dbform> is defined with two methods, fieldtext and process. The create/display routine performs a database select statement to read the record. It assigns the complete database record to a field of the object so that all following calls of fieldtext can access the values.

<fieldtext> creates an HTML input field. Its initial value is the field value contained in the database. The field name itself is prefixed by this.bid which is generated by registerme so that input fields of different objects receive different names. The process method gets one parameter. It contains all input fields belonging to the object. It performs the appropriate database update.

The heitml system includes a browser based WYSIWYG component editor. A component is nothing else than a heitml object, that can be edited by the component editor.

The component editor displays an ordinary heitml page in the browser and attaches handles to every component on the page. Then the user can click on the handle to modify the attributes of a component. It is also possible to select new components from a catalog and add them to an existing page.

To program a component, an ordinary heitml class needs to be programmed to perform the desired function. Then, this class needs to inherit the class Component or SimpleComponent. For SimpleComponents, this is all that needs to be done. For Components an additional component description file needs to be created ususally named 'com_Classname'. The component description file contains documentation and help texts to be displayed by the component editor. It also describes the possible values and the desired formatting of the component attributes.

heitml can work as a CGI program or as a web server extension using the ISAPI or apache API interfaces. heitml is first translated using state of the art compiler techniques into an intermediate representation and is then interpreted.

When a user requests several pages from a server then (some) variables in heitml keep their values, including all objects they refer to. Keeping state is a crucial feature for many applications.

In CGI applications and web applications it is not possible to keep data from one page access to another. CGI scripts are started anew for each request and so lose all memory. When using the API of a multi-process server like apache, page requests for the same user might be handled by different tasks. In multi-threaded servers like the MIIS, variables are kept, but all programs must be thread-safe, since they must be able to process multiple requests in parallel.

Advantageously, heitml abstracts from the underlying mechanisms and simulates a simple persistent memory for the author, although heitml is available for all the interfaces described above.

After each page access heitml performs a kind of garbage collection to find out which objects need to be kept. These are written to file and read in again when needed. This way user sessions can have very long timeouts and are persistent even beyond server crashes.

More and more websites turn out to be large software systems consisting of HTML pages and HTML generation programs. There are well known principles to support the creation of large software systems, to enhance maintainability, and to reuse software parts. Encapsulation, information hiding, and abstraction are familiar mechanisms. Currently, HTML and most of its derivatives lack these mechanisms. There is no way to structure a web site in HTML in a top-down or bottom-up manner because HTML supports neither encapsulation, nor information hiding, nor abstraction. There is no way to hide unnecessary technical details and no way to reuse parts several times.

Many applications require HTML pages to be dynamically changing. There are many approaches to generate pages or their parts from programs (two-level language approach). This approach sacrifices the simplicity of HTML that makes it intuitive for thousands of non-programmers, graphic designers, and text authors. However this approach creates unnecessary complexity for programmers, too, since two different languages have to be used. This often enforces a bad program structure, scattering logically connected parts throughout the system since the abstraction mechanisms of the programming language can not be used for the HTML part.

On the other hand, object oriented languages have tremendous success because of their ability to create large, maintainable event driven systems. In object oriented languages, classes encapsulate state and provide clean interfaces. Together with inheritance and genericness this provides an enormous possibility for reuse.

heitml has been designed to enrich HTML with these advantages. heitml is an object oriented programming language which smoothly combines the markup features of HTML with modern concepts such as inheritance, operational methods, and user-defined elements. Classes describe tags that can be used to place user-defined objects on web pages. A heitml class generates HTML code, expanding its program to a final text. A heitml class can be reused and extended which allows designing web page systems in a modular, class-based way.

The invention claimed is:

1. A method for implementing client/server applications, wherein requests including data are sent from a client computer to a server computer, comprising:
   in response to an initial request received by the server computer:
   storing a plurality of objects on the server computer, each belonging to a class in a set of classes implementing components, each class in the set of classes having a first method,
   the server computer assigning a unique identifier to each stored object,
   generating a document having a plurality of the unique identifiers embedded in the document, and
   sending the generated document via a data network to the client computer, and in response to a subsequent request received by the server computer:
   analyzing at least a portion of the data contained in the subsequent request,
   for at least one unique identifier found in the subsequent request, finding the object associated with said unique identifier in the plurality of objects, and
   calling at least the first method of the object.

2. The method of claim 1, wherein the step of assigning a unique identifier provides identifiers that are unique within each session.

3. The method of claim 1, further comprising:
   the client computer and the server computer communicating via the http protocol, and
   wherein the step of generating a document further comprises embedding one or more unique identifiers inside tags contained in the generated document.

4. The method of claim 1, wherein at least one subsequent request contains a plurality of unique identifiers, and the first method of at least two different objects associated with said plurality of unique identifiers is called.

5. The method of claim 1, wherein the step of generating a document embeds one or more unique identifiers inside name attributes of tags.

6. The method of claim 1, wherein the first method contains steps to process a portion of the data contained in the subsequent request.

7. The method of claim 1, wherein the first method contains steps to check a portion of the data contained in the subsequent request.

8. A computer readable medium encoded with computer-readable instructions to perform the method recited in claim 1.

9. A server computer implementing client/server applications, the server computer connected to a client computer by a data network, wherein the client computer runs a browser program which sends requests to the server computer and whereby the server computer responds to these requests by generating documents and by sending the generated documents to the client computer via the data network, the server computer comprising:
   a data store;
   a processor;
   a document generator program residing in the data store; and
   a set of classes implementing components and residing in the data store, each class having a first method;
   the document generator program having instructions that when executed by the processor cause the processor to carry out the steps of:
   in response to an initial request received from the client computer:
   storing a plurality of objects in the data store, each object belonging to one of the classes,
   assigning a unique identifier to each stored object, and
   generating a document having a plurality of the unique identifiers embedded in the generated document,
   in response to a subsequent request received from the client computer:
   analyzing at least a portion of data contained in the subsequent request,
   for at least one unique identifier found in the data of the subsequent request, finding the object associated with the unique identifier in the plurality of objects, and
   calling at least the first method of the object.

10. The server computer of claim 9, wherein the step for assigning a unique identifier assigns identifiers that are unique within each session.

11. The server computer of claim 9, wherein the client computer and the server computer communicate via the http protocol, the instructions further comprising:
   embedding one or more unique identifiers inside tags contained in the generated document.

12. The server computer of claim 9, the instructions for the document generator program further comprising:
   for at least one subsequent request, repeating the finding step to find the objects associated with at least two unique identifiers contained in the data, and repeating the calling step for at least two found objects.

13. The server computer of claim 9, the instructions further comprising:
   embedding one or more of the unique identifiers inside name attributes of tags in the generated document.

14. The server computer of claim 9, wherein the first method contains instructions to process a portion of the data contained in the subsequent request.

15. The server computer of claim 9, wherein the first method contains instructions to check a portion of the data contained in the subsequent request.

* * * * *